US012602738B2

(12) United States Patent
Smirnov

(10) Patent No.: US 12,602,738 B2
(45) Date of Patent: Apr. 14, 2026

(54) NOISE REDUCTION CIRCUIT WITH DEMOSAIC PROCESSING

(71) Applicant: Apple Inc., Cupertino, CA (US)

(72) Inventor: Maxim Smirnov, Wilsonville, OR (US)

(73) Assignee: APPLE INC., Cupertino, CA (US)

( * ) Notice: Subject to any disclaimer, the term of this patent is extended or adjusted under 35 U.S.C. 154(b) by 257 days.

(21) Appl. No.: 18/128,479

(22) Filed: Mar. 30, 2023

(65) Prior Publication Data

US 2024/0331087 A1 Oct. 3, 2024

(51) Int. Cl.
*G06T 3/4015* (2024.01)
*G06T 5/70* (2024.01)

(52) U.S. Cl.
CPC .............. *G06T 3/4015* (2013.01); *G06T 5/70* (2024.01); *G06T 2207/20182* (2013.01)

(58) Field of Classification Search
CPC ..................... G06T 3/4015; G06T 5/70; G06T 2207/20182; G06T 5/20; G06T 2207/10024; G06T 5/50; G06T 2207/20221; G06T 2207/20028; G06T 7/90; G06T 5/00; G06T 5/73; G06T 3/4046; G06T 5/60; G06T 9/002; G06T 2207/20076; G06T 2207/20081;
(Continued)

(56) References Cited

U.S. PATENT DOCUMENTS 9,036,695 B2 * 5/2015 Yang .................... H04N 19/172
375/240.12
9,892,946 B1 * 2/2018 Cheng ............... H01L 21/67161
(Continued)

FOREIGN PATENT DOCUMENTS

| CN | 108492265 A | * | 9/2018 | ........... G06T 3/4015 |
| CN | 108694705 A | * | 10/2018 | ............. G06T 5/002 |
| CN | 113378620 A | * | 9/2021 | ........... G06F 17/142 |
| CN | 113888405 A | * | 1/2022 | ............. G06N 3/048 |

(Continued)

OTHER PUBLICATIONS

George, G. et al. "A Survey on Various Median Filtering Techniques for Removal of Impulse Noise from Digital Image." IEEE Conference on Emerging Devices and Smart Systems (ICEDSS), Mar. 2-3, 2018, pp. 235-238.

(Continued)

*Primary Examiner* — Jose L Couso

(74) *Attorney, Agent, or Firm* — Sterne, Kessler, Goldstein & Fox, P.L.L.C.

(57) ABSTRACT

A noise reduction circuit that performs demosaic-based noise reduction on image data. The noise reduction circuit includes a pre-demosaic circuit, a kernel calculation circuit, a noise filtering circuit, and a blending circuit. The pre-demosaic circuit generates a de-mosaiced version of an image. The kernel calculation circuit generates a denoising kernel for at least one pixel of the image and a bilateral kernel for the at least one pixel of the image using the de-mosaiced version of the image. The noise filtering circuit performs noise filtering of the image using the denoising kernel to generate a first de-noised version of the image, and performs noise filtering of the image using the bilateral kernel to generate a second de-noised version of the image. The blending circuit blends the first de-noised version with the second de-noised version to generate an output de-noised version of the image.

20 Claims, 12 Drawing Sheets

(58) Field of Classification Search

CPC .......... G06T 2207/20084; G06V 10/56; G06V 10/30; G06V 10/454; G06V 10/54; G06V 10/774; G06V 10/82; G06V 20/41; G06V 30/18057; G06V 20/698; G06V 30/19173; H04N 23/741; H04N 9/646; H04N 1/6008; H04N 25/60; G06N 3/02; G06N 3/08–088; G06N 3/0445; G06N 3/0454; G06N 3/0464; G06N 3/4046; G06N 3/4053; G06N 7/00; G06N 7/01; G06N 20/00; G06K 7/1482; G06F 18/214; G06F 18/22; G06F 18/241; G06F 18/24; G06F 18/2411; G06F 18/2415; G06F 30/27; Y10S 128/925

See application file for complete search history.

(56) References Cited

U.S. PATENT DOCUMENTS

| | | | |
|---|---|---|---|
| 10,572,979 B2 * | 2/2020 | Vogels ................. | G06F 18/2113 |
| 10,643,306 B2 | 5/2020 | Hwang et al. | |
| 10,672,109 B2 * | 6/2020 | Vogels ...................... | G06T 5/60 |
| 10,692,177 B2 | 6/2020 | Wang et al. | |
| 10,706,508 B2 | 7/2020 | Vogels et al. | |
| 10,789,684 B2 * | 9/2020 | Prentice ................... | G06T 5/20 |
| 10,796,414 B2 | 10/2020 | Vogels et al. | |
| 10,879,946 B1 | 12/2020 | Shima | |
| 11,132,771 B2 | 9/2021 | Gordon et al. | |
| 11,151,702 B1 | 10/2021 | Tico et al. | |
| 2009/0278961 A1 | 11/2009 | Mohanty et al. | |
| 2010/0215267 A1 * | 8/2010 | Aldrich ................. | H04N 23/81 |
| | | | 382/167 |
| 2012/0182454 A1 * | 7/2012 | Schwartz ............. | H04N 23/843 |
| | | | 348/E5.091 |
| 2015/0030237 A1 | 1/2015 | Jancsary et al. | |
| 2018/0197277 A1 * | 7/2018 | Shi ........................... | G06T 5/70 |
| 2018/0233711 A1 * | 8/2018 | Kato .................. | H01M 50/126 |
| 2018/0293711 A1 * | 10/2018 | Vogels ................. | G06V 10/764 |
| 2018/0315172 A1 | 11/2018 | Smirnov et al. | |
| 2019/0378246 A1 * | 12/2019 | Prentice ................... | G06T 5/70 |
| 2020/0260001 A1 | 8/2020 | Douady-Pleven et al. | |
| 2020/0342579 A1 | 10/2020 | Lin et al. | |
| 2021/0073957 A1 | 3/2021 | Slabaugh et al. | |
| 2021/0150674 A1 | 5/2021 | Cai et al. | |
| 2021/0241429 A1 * | 8/2021 | Pan ........................... | G06T 5/20 |
| 2021/0337098 A1 | 10/2021 | Gordon et al. | |
| 2021/0358081 A1 | 11/2021 | Kokura | |
| 2021/0390670 A1 * | 12/2021 | Moon ....................... | G06T 5/50 |
| 2021/0390671 A1 * | 12/2021 | Moon ....................... | G06T 7/97 |
| 2022/0092357 A1 | 3/2022 | Takada | |
| 2022/0138964 A1 | 5/2022 | Gintsburg et al. | |
| 2022/0375078 A1 | 11/2022 | O'Connor | |
| 2023/0034109 A1 * | 2/2023 | Le .......................... | H04N 23/85 |
| 2023/0325970 A1 * | 10/2023 | Guillaume ............ | G06T 3/4015 |
| 2024/0062342 A1 * | 2/2024 | Jangid ...................... | G06T 5/70 |
| 2024/0320787 A1 * | 9/2024 | Shen ..................... | G06T 3/4015 |

FOREIGN PATENT DOCUMENTS

| | | | | | |
|---|---|---|---|---|---|
| CN | 114445290 A | * | 5/2022 | .......... | G06T 3/4015 |
| CN | 115564685 A | * | 1/2023 | ............ | G06F 18/22 |
| CN | 115829870 A | * | 3/2023 | | |
| CN | 114240772 B | * | 7/2024 | ............ | G06F 18/22 |
| WO | WO-2013079778 A2 | * | 6/2013 | .......... | H04N 25/134 |
| WO | 2022106554 A2 | | 5/2022 | | |

OTHER PUBLICATIONS

Subudhi, S. et al. "Bilateral Kernel Extraction from PCA for Classification of Hyperspectral Images." PFG—Journal of Photogrammetry, Remote Sensing and Geoinformation Science, vol. 87, Sep. 6, 2019, pp. 205-221.

Yang, X. et al. "Fast Reconstruction for Monte Carlo Rendering Using Deep Convolutional Networks." IEEE Access, vol. 7, Dec. 9, 2018, pp. 21177-21187.

Knaus, Claude, and Matthias Zwicker. "Dual-domain image denoising." 2013 IEEE International Conference on Image Processing. IEEE, 2013. (Year: 2013), Sep. 15-18, 2013.

Office action of U.S. Appl. No. 18/117,644, filed Mar. 6, 2023, mailed Jul. 9, 2025; 20 pages.

* cited by examiner

De-Noising Circuit
458

Noise Reduction Circuit
520

FIG. 7

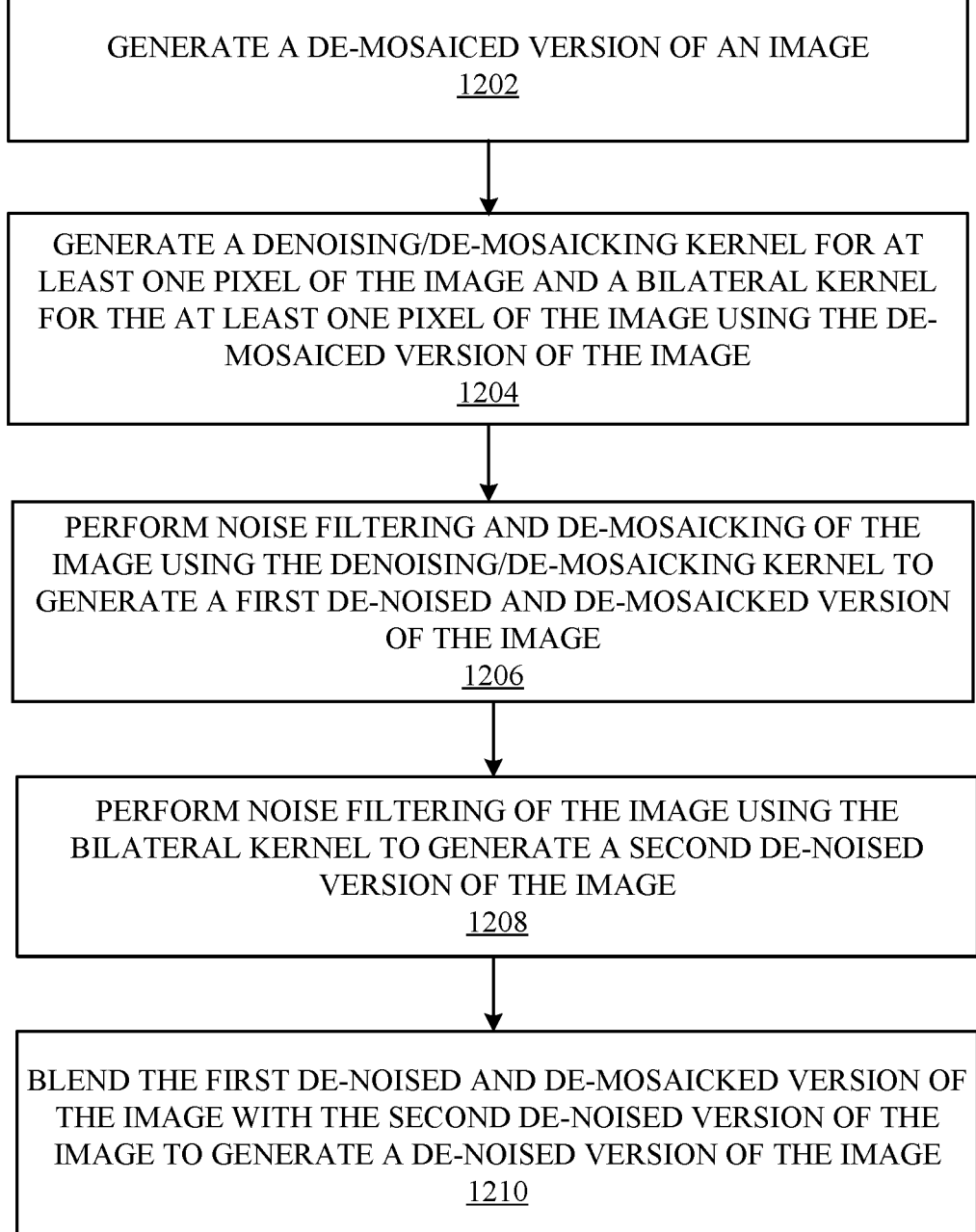

GENERATE A DE-MOSAICED VERSION OF AN IMAGE
1202

GENERATE A DENOISING/DE-MOSAICKING KERNEL FOR AT LEAST ONE PIXEL OF THE IMAGE AND A BILATERAL KERNEL FOR THE AT LEAST ONE PIXEL OF THE IMAGE USING THE DE-MOSAICED VERSION OF THE IMAGE
1204

PERFORM NOISE FILTERING AND DE-MOSAICKING OF THE IMAGE USING THE DENOISING/DE-MOSAICKING KERNEL TO GENERATE A FIRST DE-NOISED AND DE-MOSAICKED VERSION OF THE IMAGE
1206

PERFORM NOISE FILTERING OF THE IMAGE USING THE BILATERAL KERNEL TO GENERATE A SECOND DE-NOISED VERSION OF THE IMAGE
1208

BLEND THE FIRST DE-NOISED AND DE-MOSAICKED VERSION OF THE IMAGE WITH THE SECOND DE-NOISED VERSION OF THE IMAGE TO GENERATE A DE-NOISED VERSION OF THE IMAGE
1210

*FIG. 12*

NOISE REDUCTION CIRCUIT WITH DEMOSAIC PROCESSING

BACKGROUND

1. Field of the Disclosure

The present disclosure relates to a circuit for processing images, and more specifically to a circuit for noise reduction of image data that uses demosaic processing.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

SUMMARY

Embodiments of the present disclosure relate to an image processing circuit that performs demosaic-based noise reduction on image data. The image processing circuit includes a noise reduction circuit with a pre-demosaic circuit, a kernel calculation circuit coupled to the pre-demosaic circuit, a noise filtering circuit coupled to the kernel calculation circuit, and a blending circuit coupled to the kernel calculation circuit and the noise filtering circuit. The pre-demosaic circuit generates a de-mosaiced version of an image. The kernel calculation circuit generates a denoising/de-mosaicking kernel for at least one pixel of the image and a bilateral kernel for the at least one pixel of the image using the de-mosaiced version of the image. The noise filtering circuit performs noise filtering and de-mosaicking of the image using the denoising/de-mosaicking kernel to generate a first de-noised and de-mosaicked version of the image. The noise filtering circuit further performs noise filtering of the image using the bilateral kernel to generate a second de-noised version of the image. The blending circuit blends the first de-noised and de-mosaicked version with the second de-noised version to generate a de-noised version of the image.

BRIEF DESCRIPTION OF THE DRAWINGS

FIG. 7 is a block diagram of a kernel calculation circuit of the noise reduction circuit of FIG. 6, according to one embodiment.

FIG. 12 is a flowchart illustrating a method of noise reduction that uses demosaic processing, according to one embodiment.

Figure 1:
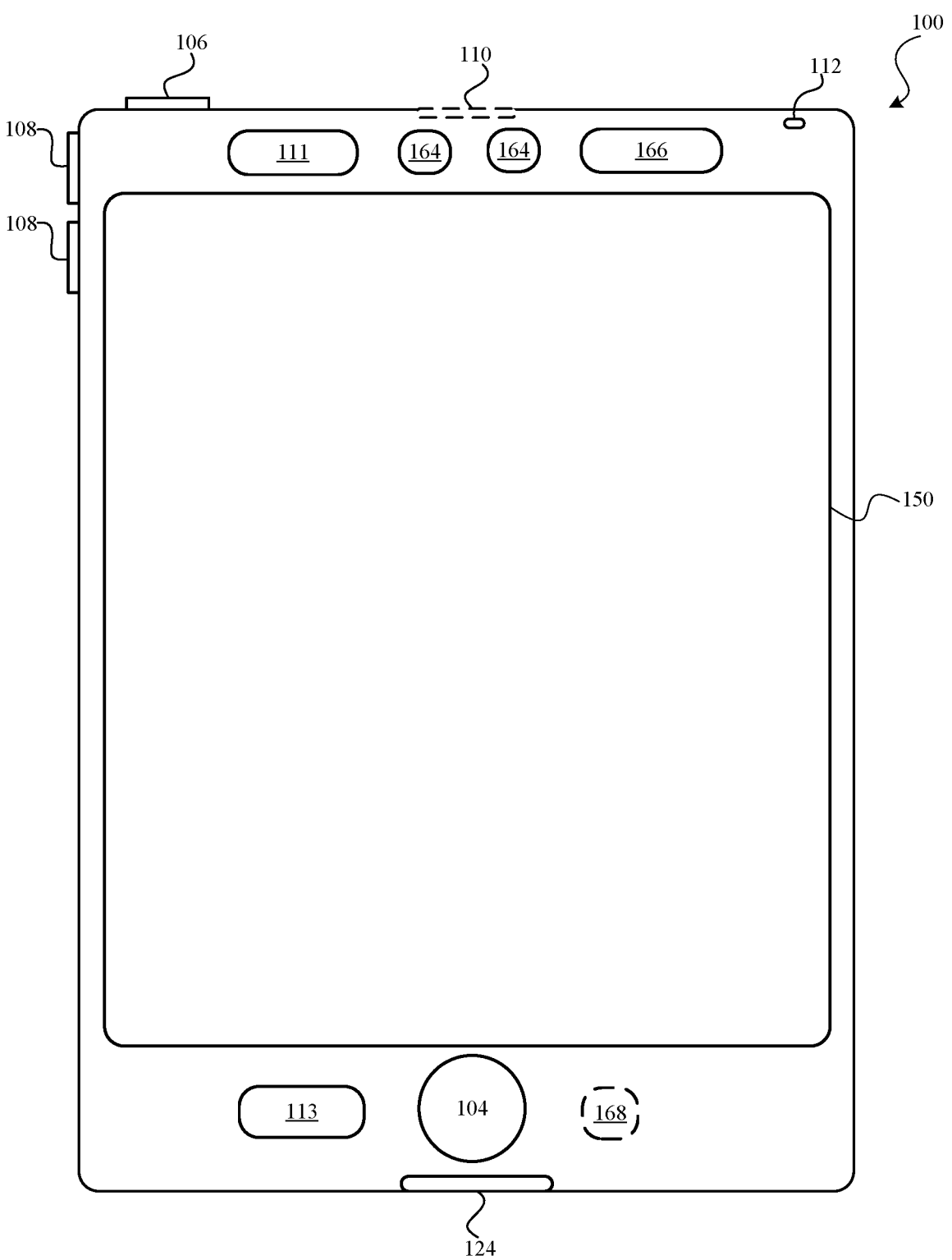
FIG. 1 is a high-level diagram of an electronic device, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a circuit for noise reduction of image data that utilizes demosaic processing. The circuit for noise reduction may first generate de-mosaiced pixel values from an unscaled version of an input image (e.g., noisy image). The de-mosaiced pixel values represent initial estimates of all color components (e.g., red, green, and blue color components) for a currently processed pixel in the input image. The circuit for noise reduction may then perform, for at least one pixel or a group of pixels (e.g., each pixel), noise filtering and de-mosaicking of the unscaled version of the input image using an adaptive denoising/de-mosaicking kernel and a bilateral kernel that are both generated using the demosaic pixel values. An initial adaptive denoising kernel may be first generated by processing a patch of the unscaled version of the input image using filter banks. The final adaptive denoising/de-mosaicking kernel may be generated by adjusting the initial adaptive denoising kernel based on photometric distances (e.g., Mahalanobis distances) between a pixel (e.g., central pixel) in a de-mosaiced image and other pixels (e.g., non-central pixels) in the patch of the unscaled version of the input image. The bilateral kernel may be generated by computing photometric distances (e.g., Mahalanobis distances) between the central pixel from the de-mosaiced image and other pixels in the patch of the unscaled version of the input image. Results of the de-noising and de-mosaicking operations performed by applying the denoising/de-mosaicking kernel and the bilateral kernel may be blended (e.g., per pixel) using an alpha parameter to generate a de-noised unscaled version of the input image. An alpha parameter represents a soft quality measure of the denoising/de-mosaicking kernel. A final de-noised unscaled version of the input image may be generated by blending the de-noised unscaled version of the input image with the original unscaled version of the input image.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, image sensors 164 may be associated with different lens configuration. For example, device 100 may include rear image sensors, one with a wide-angle lens and another with as a telephoto lens. Device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
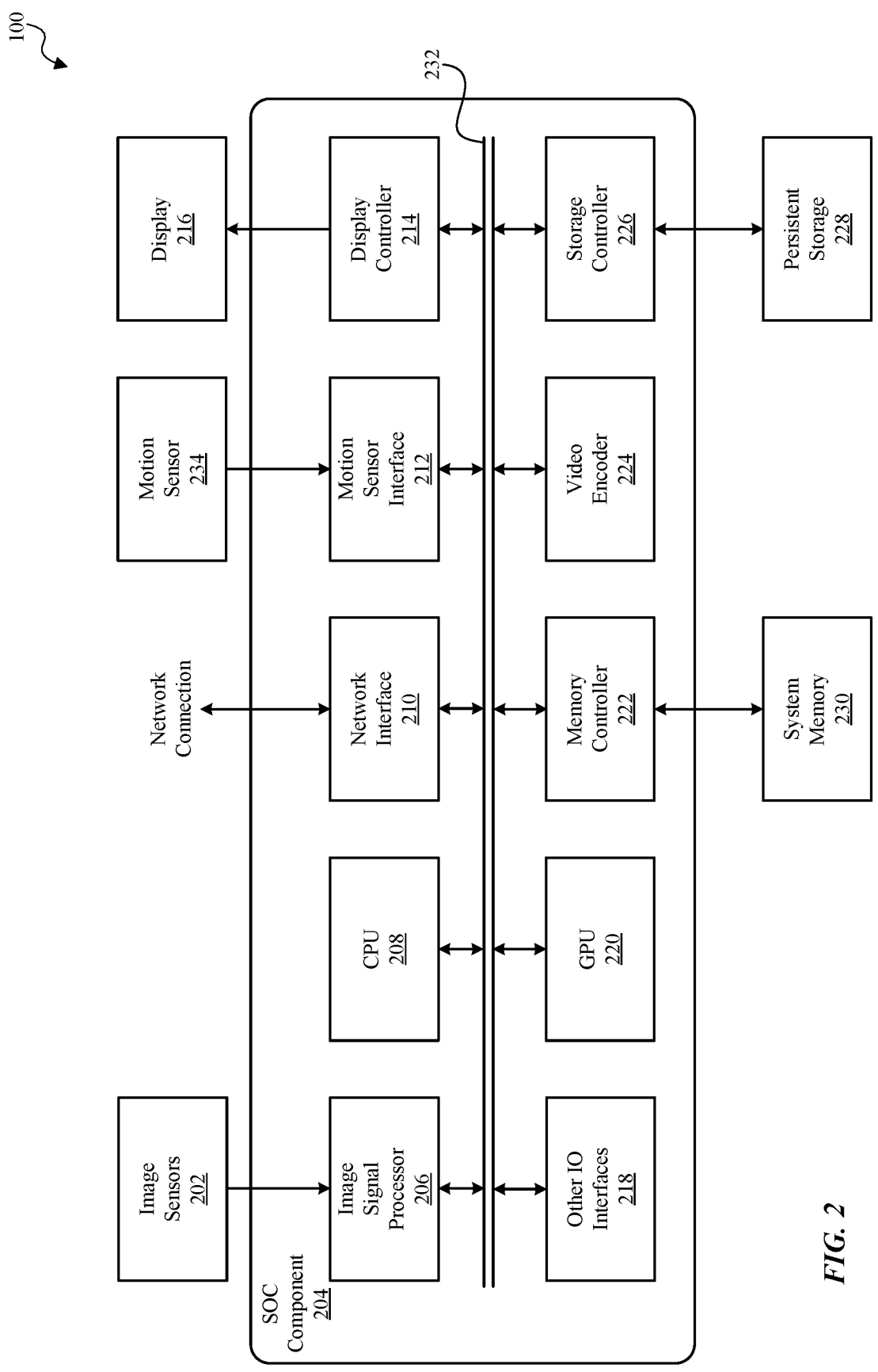
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, device 100 may include, among other components, image sensors 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). Image sensors 202 may also include optical and mechanical components that assist image sensing components (e.g., pixels) to capture images. The optical and mechanical components may include an aperture, a lens system, and an actuator that controls lens positions of image sensors 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 216 may display various images, such as menus, selected operating parameters, images captured by image sensors 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a CPU 208, a network interface 210, motion sensor interface 212, display controller 214, graphics processing unit (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

GPU 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between device 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display 216. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, GPU 220 or system memory 230, and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from image sensors 202 and processed by ISP 206, and then sent to system memory 230 via bus 232 and memory controller 222. After the image data is stored in system memory 230, it may be accessed by video encoder 224 for encoding or by display 216 for displaying via bus 232.

In another example, image data is received from sources other than image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
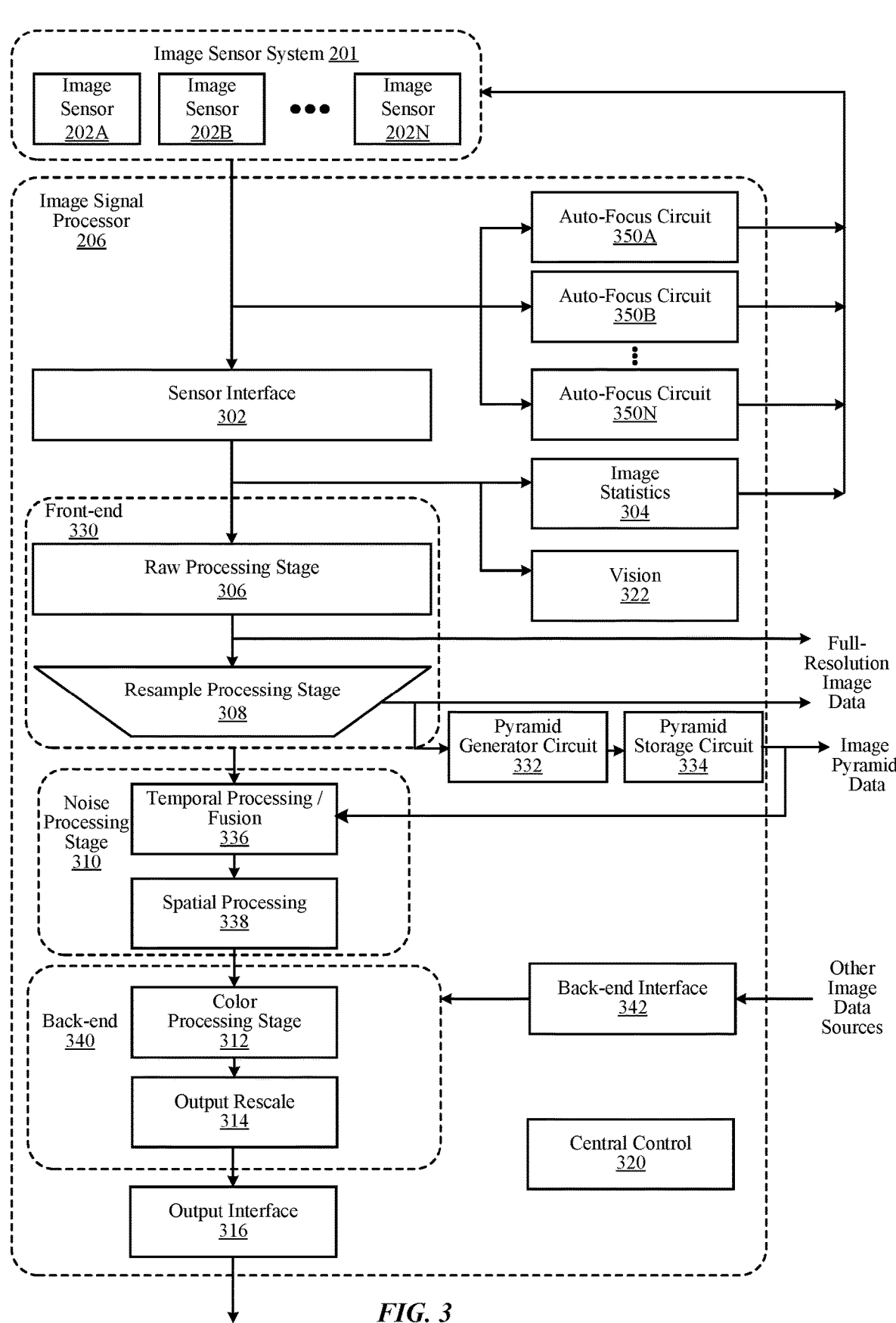
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. Image sensor system 201 may include one or more sub-systems that control image sensors 202 individually. In some cases, each image sensor 202 may operate independently while, in other cases, image sensors 202 may share some components. For example, in one embodiment, two or more image sensors 202 may share the same circuit board that controls the mechanical components of image sensors 202 (e.g., actuators that change the lens positions of each image sensor). The image sensing components of image sensor 202 may include different types of image sensing components that may provide raw image data in different forms to ISP 206. For example, in one embodiment, the image sensing components may include multiple focus pixels that are used for auto-focusing and multiple image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, noise-processing stage 310, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if front-end pipeline stages 330 process two pixels per clock cycle, then operations of raw processing stage 306 (e.g., black level compensation, highlight recovery and defective pixel correction) may process two pixels of image data at a time. In contrast, one or more of noise processing stage 310 and/or back-end pipeline stages 340 may process image data at a different rate less than the initial data rate. For example, in the embodiment of FIG. 3, back-end pipeline stages 340 (e.g., color processing stage 312, and output rescale 314) may process image data at a reduced rate (e.g., one pixel per clock cycle).

Raw image data captured by image sensors 202 may be transmitted to different components of ISP 206 in different manners. In one embodiment, raw image data corresponding to the focus pixels may be sent to auto-focus circuits 350 while raw image data corresponding to the image pixels may be sent to sensor interface 302. In another embodiment, raw image data corresponding to both types of pixels may simultaneously be sent to both auto-focus circuits 350 and sensor interface 302.

Auto-focus circuits 350 may include a hardware circuit that analyzes raw image data to determine an appropriate lens position of each image sensor 202. In one embodiment, the raw image data may include data that is transmitted from image sensing pixels that specializes in image focusing. In another embodiment, raw image data from image capture pixels may also be used for auto-focusing purpose. Auto-focus circuits 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to image sensor system 201 to control the lens positions of image sensors 202. For example, image sensor 202 may include a control circuit that analyzes the auto-focusing data to determine a command signal that is sent to an actuator associated with the lens system of image sensor 202 to change the lens position of image sensor 202. The data generated by auto-focus circuits 350 may also be sent to other components of ISP 206 for other image processing purposes. For example, some of the data may be sent to image statistics 304 to determine information regarding auto-exposure.

Auto-focus circuits 350 may be individual circuits that are separate from other components such as image statistics 304, sensor interface 302, front-end pipeline stages 330, noise processing stage 310, and back-end pipeline stages 340. This allows ISP 206 to perform auto-focusing analysis independent of other image processing pipelines. For example, ISP 206 may analyze raw image data from image sensor 202A to adjust the lens position of image sensor 202A using auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of image sensor 202. Device 100 may perform auto focusing for different image sensors 202 even if one or more image sensors 202 are not in active use. This allows a seamless transition between two image sensors 202 when device 100 switches from one image sensor 202 to another. For example, in one embodiment, device 100 may include a wide-angle camera and a telephoto camera as a dual back camera system for photo and image processing. Device 100 may display images captured by one of the dual cameras and may switch between the two cameras from time to time. The displayed images may seamlessly transition from image data captured by one image sensor 202 to image data captured by another image sensor 202 without waiting for the second image sensor 202 to adjust its lens position because two or more auto-focus circuits 350 may continuously provide auto-focus data to image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from image sensors 202 to sensor interface 302 in raster order (e.g., horizontally, line by line). The subsequent processes in the pipeline may also be performed in raster order and the result may also be output in raster order. Although only a single sensor interface 302 is illustrated in FIG. 3, a corresponding number of sensor interfaces 302 may be provided in ISP 206 to process raw image data from each image sensor 202.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Pyramid generator circuit 332 is a circuit configured to receive processed image output by resample processing stage 308, and generate an image pyramid based upon the received image. Each generated pyramid includes multiple downscaled images (also referred to as levels, scales, or octaves) each having a different resolution obtained by sequentially downscaling a received image. In some embodiments, each downscaled image of the pyramid includes the multiple color components (e.g., YCrCb or RGB) of the image. In addition, the pyramid includes an unscaled version (e.g., Y component only or Bayer sampled RGB color plane) of the image. As such, the generated pyramid may include multiple stages 0 through N (e.g., six stages, corresponding to stages 0 through 5), where stage 0 corresponds to the unscaled image (e.g., Y component only or Bayer sampled RGB color plane), while stages 1 through N correspond to sequentially downscaled images with multiple color components (e.g., YCrCb or RGB), and the value of N (e.g., N=5) corresponds to a number of downscaled levels. In some embodiments, each sequential stage of downscaling corresponds to downscaling each of the width and height by a factor of two relative to a previous stage. The generated pyramid thus includes low frequency components of the downscaled versions of the received image and a low frequency component of an unscaled version (e.g., Y component or Bayer sampled RGB color plane) of the received image.

Pyramid storage circuit 334 is configured to receive an image pyramid (e.g., generated by pyramid generator circuit 332) and store the image pyramid in a memory. The image pyramid generated by pyramid generator circuit 332 is provided to noise processing stage 310 for further processing (e.g., image fusion and noise reduction). In some embodiments, pyramid storage circuit 334 stores a received image pyramid based upon how the image pyramid will be used for subsequent processing. For example, in some embodiments, a first image pyramid corresponding to a first image is fused with a second image pyramid corresponding to a second image, wherein the first or second image pyramid (corresponding to a "secondary" image) is warped based upon one or more warping parameters to align with the other image pyramid (corresponding to a "primary" image). In some embodiments, where the image pyramid is to be warped during an image fusion process, pyramid storage circuit 334 converts the image pyramid into a tile format for storage. On the other hand, if the image pyramid does not need to be warped, pyramid storage circuit 334 may cause the image pyramid to be stored in raster format. In some embodiments, pyramid storage circuit 334 includes a direct memory access (DMA) circuit, which may store the image pyramid (in raster or tile format) within persistent memory (e.g., a DRAM) or within a memory cache (e.g., an SRAM buffer that retains a portion of the image pyramid in the main system memory). In some embodiments, if only a portion of the image pyramid is to be stored (e.g., the image pyramid is to be immediately used for image fusion, such that only a portion of the pyramid needs to be stored at a time), then the DMA may store the image pyramid in memory cache, which acts as a buffer between pyramid generator circuit 332 and the subsequent processing circuits (e.g., an image fusion circuit implemented as part of noise processing stage 310). On the other hand, if the entire image pyramid is to be stored, and/or stored for a length of time, then the image pyramid is stored in DRAM.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics module 304. In such embodiments, each image statistics module 304 may be programmed by central control module 320 to collect different information for the same or different image data.

Vision module 322 performs various operations to facilitate computer vision operations at CPU 208 such as facial detection in image data. Vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in image analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. In some embodiments, noise processing stage 310 includes a temporal processing and fusion circuit 336 and a spatial processing circuit 338, configured to perform temporal filtering and spatial filtering, respectively, on received image data. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiments, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. For example, noise processing stage 310 may perform image fusion by warping and fusing an image frame with a reference frame. In some embodiments, image fusion is performed using image pyramids of received image frames (e.g., generated by the pyramid generator circuit 332). In other embodiments, such as that illustrated in FIG. 4, spatial noise filtering may not be included as part of the temporal loop for temporal filtering (e.g., the spatial noise filter is applied to an image frame after it is stored as a reference image frame and thus the reference frame is not spatially filtered).

Back-end interface 342 receives image data from other image sources than image sensors 202 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end pipeline stages 340.

For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3. Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale module 314 may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware, or software.

Example Pipelines for Image Fusion and Noise Reduction

Figure 4:
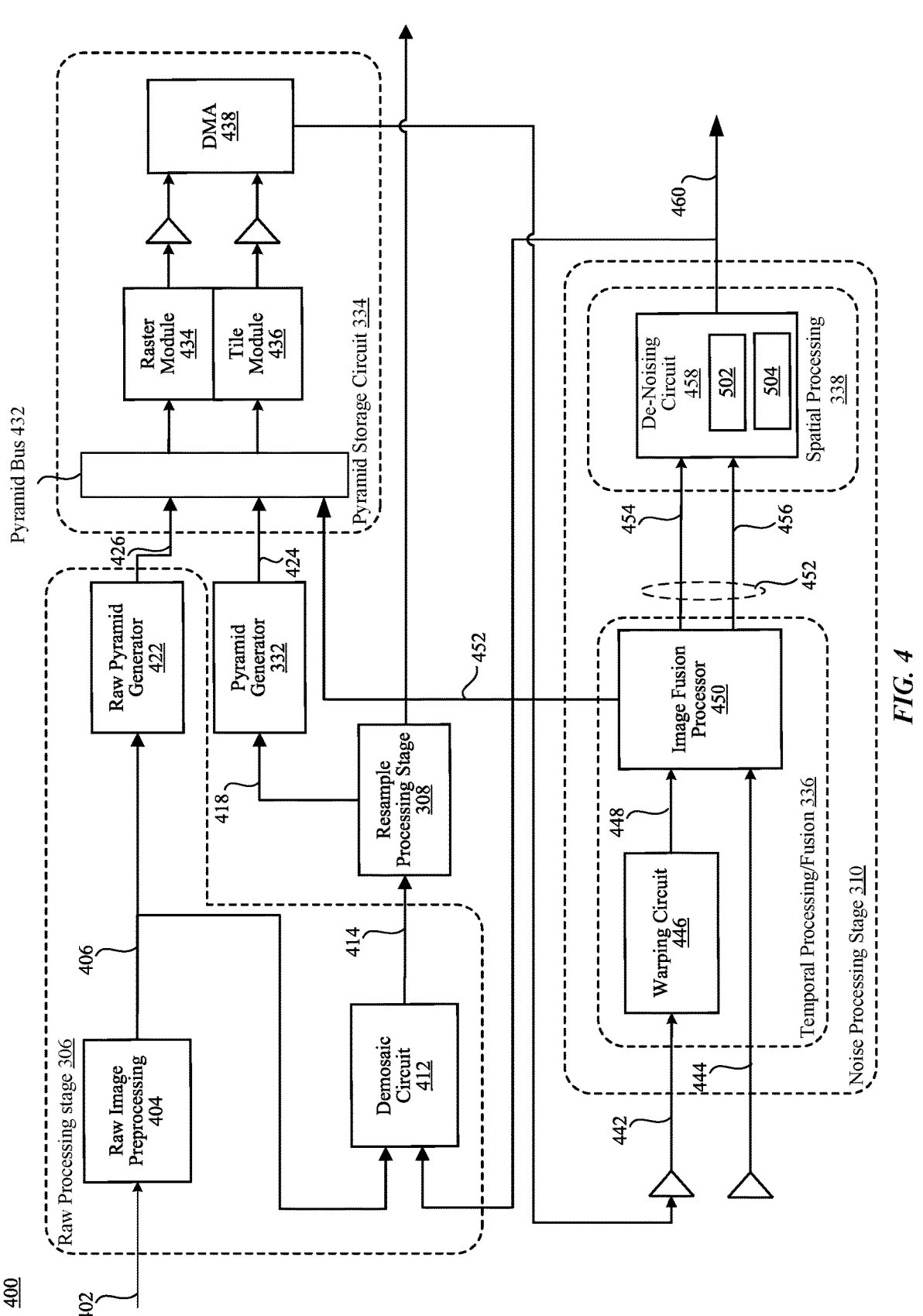
FIG. 4 is a block diagram illustrating a portion of the image processing pipeline including circuitry for noise reduction, according to one embodiment.

FIG. 4 is a block diagram illustrating a portion of the image processing pipeline including an image fusion circuit 400 for dual-mode image fusion, according to one embodiment. Image fusion circuit 400 may be implemented as part of vision module 322, front-end pipeline stages 330 (e.g., raw processing stage 306 and resample processing stage 308), pyramid generation circuit 332, pyramid storage circuit 334, and/or noise processing stage 310 illustrated in FIG. 3. For example, in some embodiments, vision module 322 performs feature extraction from received images (e.g., based on keypoints of the received images) used for warping generated image pyramids, while pyramid generation is performed by raw processing stage 306 (for generating raw image pyramids) and pyramid generation circuit 332, and image fusion and noise reduction are performed at back-end pipeline stages 340 (e.g., noise processing stage 310).

Image fusion circuit 400 is configurable to perform image fusion applications in at least two different modes, including a first processed image mode (e.g., YCC mode) in which raw image data is de-mosaiced and resampled prior to image pyramid generation and image fusion, and a second raw image mode in which image pyramid generation and image fusion is performed using received raw image data (e.g., Bayer image data). By performing image fusion using the raw image data, the fused image is generated with a greater amount of accuracy relative to the original image data. However, doing so may consume a larger memory footprint, which may not be practical for all applications. On the other hand, performing image fusion using the processed image mode may consume less memory when the de-mosaiced image is downscaled/resampled, but may result in fused images that are less accurate. As such, by being configurable to perform image fusion in either mode, image fusion circuit 400 is able to generate fused images for a variety of different applications with different requirements for image signal accuracy and memory use. In addition, within each mode, image fusion circuit 400 may implement different types of fusion schemes, including bypass (e.g., no fusion), two-frame fusion (including but not limited to generation of HDR images), temporal filtering such as infinite impulse response (IIR) or finite impulse response (FIR), and/or the like. The image fusion functions by image fusion circuit 400 on received images may be referred to as "temporal processing." The temporally processed images may then be received by a noise reduction circuit for performing "spatial processing" of the image. As such, image fusion circuit 400 is used to perform "temporal-then-spatial" processing on received images.

As shown in FIG. 4, image fusion circuit 400 may include raw processing stage 306, resample processing state 308, and noise processing stage 310. Each of these stages may be operated differently based on whether image fusion circuit 400 is operating in the first processed image mode or second raw image mode. In some embodiments, a controller (e.g., central control 320 illustrated in FIG. 3, not shown in FIG. 4) is coupled to image fusion circuit 400 and configures the components of image fusion circuit 400 to perform different operations based on the desired mode or image fusion scheme. In some embodiments, the controller sets a control register based on whether image fusion circuit 400 is to operate in the first processed image mode or the second raw image mode. The components of image fusion circuit 400 (e.g., raw processing stage 306, resample processing stage 308, and noise processing stage 310) may access the control register to determine which mode to operate in, and, based on the value of the control register, perform different operations based on the selected mode.

Image fusion circuit 400 receives raw image data 402 captured by image sensor system 201. In some embodiments, raw image data 402 corresponds to multiple sequentially captured images, while in other embodiments, raw image data 402 may correspond to sets of images captured concurrently using different image sensors 202 (e.g., first and second images captured at the same time using different sensors with different exposure times). Raw image data 402 may be received in a raw Bayer image format.

Raw image processing circuit 404 of raw processing stage 306 receives raw image data 402, and performs a series of Bayer preprocessing operations on the received raw image data. For example, as discussed above, operations performed by raw image processing circuit 404 of raw processing stage 306 may include, but are not limited to, raw noise filtering (RNF), lens shading correction (LSC), highlight recovery (HR), sensor linearization (SLIN), etc. In some embodiments, raw image processing circuit 404 includes a preprocessing pipeline in which raw image data 402 undergoes multiple preprocessing operations in series. Raw image preprocessing circuit 404 outputs the image data generated from preprocessing raw image data 402 as preprocessed raw image data 406. In some embodiments, different preprocessing operations may be performed based on whether the image fusion circuit 400 is running in processed image/YCC mode or raw image mode (e.g., in some embodiments, the preprocessing operations may include a raw noise filtering operation when the image fusion circuit 400 is in processed image mode to aid in de-mosaicking, while the raw noise filter may be bypassed when the image fusion circuit 400 is running in raw image mode).

Raw image processing circuit 404 of raw processing stage 306 is coupled to a raw pyramid generator circuit 422 and demosaic circuit 412, and is configured to route preprocessed raw image data 406 to either raw pyramid generator circuit 422 or demosaic circuit 412, based on whether image fusion circuit 400 is operating in the first or second mode (e.g., using a MUX or other type of routing circuitry). For example, in the first processed image mode, raw image preprocessing circuit 404 transmits the preprocessed raw image data to demosaic circuit 412.

Demosaic circuit 412 is configured to receive raw image data (e.g., preprocessed raw image data 406), and demosaics the received raw image data to generate full-color image data 414 (e.g., RGB image data). For example, demosaic circuit 412 may convert or interpolate missing color samples from received raw Bayer image data to output image data into a full-color domain. Demosaic operations may include low pass directional filtering on the interpolated samples to obtain full-color pixels. In some embodiments, full-color image data 414 output by demosaic circuit 412 is of the same resolution as the received Bayer image data.

Demosaic circuit 412 outputs full-color image data 414 to resample processing stage 308. As discussed above, resample processing stage 308 may perform various operations to convert, resample, or scale image data received from raw processing stage 306. In some embodiments, resample processing stage 308 converts received image data 414 from an RGB format into YCbCr format for further processing. Resample processing stage 308 may further upscale or downscale the image data. For example, resample processing stage 308 may downscale the image data by performing vertical resampling followed by horizontal resampling. In addition, resample processing stage 308 may perform additional operations, such as removing color aliasing artifacts near luminance edges that may have been introduced by demosaic circuit 412. In some embodiments, resample processing stage 308 may also operate in a non-scaling mode, e.g., without downscaling the image data. In some embodiments, resample processing stage 308 converts received image data to a YCC 4:4:4 color space when operating in non-scaling mode, and to a YCC 4:2:2 color space if performing upscaling or downscaling.

In the first processed image mode, resampled image data 418 output by resample processing stage 308 is received by pyramid generator circuit 332, which generates an image pyramid 424 for each image frame of the image data. As discussed above, each generated pyramid includes an unscaled single color version of the received image frame (e.g., Y component only), and multiple full-color downscaled versions of the image obtained by sequentially downscaling the received image frame. The generated pyramid thus includes low frequency components of the downscaled images and an unscaled single color version (e.g., Y component) of the received image frame.

Pyramid storage circuit 334 receives image pyramids 424 output by pyramid generator circuit 332, and stores image pyramids 424 in memory in preparation for warping and/or fusion. For example, in applications where two captured images are to be fused (e.g., concurrently captured long exposure image frame and short exposure image frame, or two sequentially captured images), pyramid generator circuit 332 may generate a pyramid for the first of the two images, which is stored using pyramid storage circuit 334 while an image pyramid for the second image is being generated.

Pyramid storage circuit 334 determines how the generated image pyramid 424 is to be stored, and may include, among other components, a pyramid bus 432, a raster module 434, a tile module 436, and DMA 438. Pyramid bus 432 receives image pyramids (e.g., image pyramids 424 from pyramid generator circuit 332, and/or raw image pyramids from raw pyramid generator circuit 422) and sends the received pyramid to raster module 434 or tile module 436, based upon whether the image pyramid is to be warped as part of an image fusion process. For example, if a received image pyramid is to be warped as part of noise processing/image fusion, pyramid bus 432 transmits the image pyramid to tile module 436 to be converted into a tile format for storage. On the other hand, if the image pyramid does not need to be warped, the image pyramid is sent through raster module 434. In some embodiments, pyramid generator circuit 332 is configured to output image pyramid 424 already in raster form. As such, raster module 434 may simply be bypass circuit, allowing image pyramid 424 to be stored to memory.

In some embodiments, raster and/or tile modules 434 and 436 output the image pyramid to DMA 438, which stores the image pyramid (in raster or tile format) within persistent memory (e.g., a DRAM) or within a cache that bypasses the memory. In some embodiments, if only a portion of the image pyramid is to be stored (e.g., the image pyramid is to be immediately used for image fusion, such that only a portion of the pyramid needs to be stored at a time), then DMA 438 may store the image pyramid using the cache, which acts as a buffer between pyramid generator circuit 332 and noise processing stage 310. On the other hand, if the entire image pyramid is to be stored, and/or stored for a length of time, then the image pyramid is stored in the DRAM. In some embodiments, the DRAM is used to a store previously processed image pyramid (e.g., a history image pyramid) to be fused with image pyramids created from received image data 402.

Noise processing stage 310 performs temporal and spatial processing on image pyramids of received images (e.g., "temporal-then-spatial" processing). Noise processing [state] stage 310 may include an image fusion processor 450 and a de-noising circuit 458. In some embodiments, noise processing stage 310 is configured to receive, from DMA 438, a first image pyramid 442 and a second image pyramid 444, and fuse first and second image pyramids 442 and 444 (e.g., at image fusion processor 450) to generate a fused image pyramid 452. Fused image pyramid 452 is then processed by de-noising circuit 458 to generate a denoised image 460. In some embodiments, image fusion processor 450 may be bypassed. For example, in some operating modes, image fusion processor 450 may receive only first image pyramid 442, and output first image pyramid 442 as fused image pyramid 452 to de-noising circuit 458.

In some embodiments, first and second images pyramids 442 and 444 correspond to image pyramids 424 generated by pyramid generator 332, using respectively, first and second images of received images 402 that have been preprocessed, de-mosaiced, and resampled (e.g., resampled image data 418 generated from received images 402). In some embodiments, at least one of first and second image pyramids 442 and 444 corresponds to a previously fused image pyramid (e.g., a previously fused image pyramid 452). How first and second image pyramids 442 and 444 are received by noise processing stage 310 may depend upon a current image fusion scheme (e.g., streaming, two-frame fusion, IIR, FIR, etc.) implemented by image fusion circuit 400. In some embodiments, noise processing stage 310 may be able to receive a generated pyramid 410 directly from pyramid generator 332 (e.g., without going through pyramid storage circuit 334).

In some embodiments, noise processing stage 310 uses a warping circuit 446 to warp first image pyramid 442 to be more spatially aligned with second image pyramid 444 prior to fusing first and second image pyramids 442 and 444, based upon one or more warping parameters. In some embodiments, the one or more warping parameters correspond to parameters determined by an image registration processor (not shown) to align the images of first image pyramid 442 with those of second image pyramid 444 (which may be referred to as a primary or reference image pyramid). In some embodiments, the image registration processor is implemented as part of vision module 322 of FIG. 3. Warping circuit 446 may perform a linear or non-linear transformation defined by a model generated by the image registration processor to warp first image pyramid 442 using mapping information according to the one or more warping parameters to generate a warped version of first image pyramid 442 (e.g., warped image pyramid 448) spatially better aligned to the image of second image pyramid 444 (e.g., a primary image or reference image). In some embodiments, warping circuit 446 is a multi-scale warping circuit configured to warp each stage of first image pyramid 442 to produce warped image pyramid 448, including an unscaled warped single-color image and multiple downscaled warped multi-color images. Warped image pyramid 448 generated by warping circuit 446 is passed onto image fusion processor 450.

Image fusion processor 450 performs per pixel blending between a portion of the images of warped image pyramid 448 generated from first image pyramid 442 with a portion of the images of second image pyramid 444 to generate fused image pyramid 452. Fused image pyramid 452 includes an unscaled single color image or Bayer sampled color image, and one or more downscaled images having multiple color components, each downscaled image corresponding to a downscaled version of a previous stage of fused image pyramid 452. In some embodiments, fused image pyramid 452 may be received by pyramid storage circuit 334 to be stored in memory (e.g., a DRAM) for use in subsequent image fusion operations, based upon a current image fusion scheme implemented by image fusion circuit 400. In addition, at least a portion of fused image pyramid 452 is passed onto de-noising circuit 458 for further processing and enhancement (e.g., spatial processing). For example, in some embodiments, an unscaled single color version 454 or unscaled Bayer sampled color image 454 (commonly referred to herein as "unscaled version 454") and a first downscaled stage (corresponding to a first downscaled level of fused image pyramid 452, and has a pixel resolution equal to a quarter of a pixel resolution of unscaled version 454) of fused image pyramid 452 are passed to de-noising circuit 458. In some other embodiments, unscaled version 454 and multiple downscaled stages 456 (e.g., stages or scales 1, 2, . . . , N) of fused image pyramid 452 are passed to de-noising circuit 458.

De-noising circuit 458 may receive at least a portion of fused image pyramid 452 (e.g., unscaled version 454 and multiple downscaled versions 456) and perform de-noising (or noise reduction) to obtain denoised image 460. In some embodiments, de-noising circuit 458 in processed image mode, generates a denoised unscaled single-color image (e.g., Y component only or Bayer sampled color plane) and a denoised first downscaled version (e.g., having Cb and Cr components, or R and B components), allowing for construction of a full-resolution image with chroma sampled as 4:2:0. In some embodiments, de-noising circuit 458 further receives confidence values associated with each pixel of unscaled version 454 and downscaled versions 456, wherein an amount of noise reduction performed may be based upon the confidence values of the received images (e.g., a higher confidence value may indicate that less noise reduction is necessary). In some embodiments, each pixel is associated with a confidence value specified using a predetermined number of bits (e.g., 4 bits), where a confidence value of 0 indicates an invalid pixel, and may indicate a number of valid image pixels fused to produce the pixel. In some embodiments, pyramid generator circuit 332 may mark overexposed pixels of received images as having a confidence value of 0, and propagate the confidence value to all stages of the generated pyramid.

In accordance with embodiments of the present disclosure, de-noising circuit 458 is implemented as an ML-based de-noising circuit. De-noising circuit 458 may include a machine learning-based noise reduction (MLNR) circuit 502 for performing MLNR on at least one pixel or a group of pixels (e.g., each pixel) of unscaled version 454, and a multi-scale machine learning-based noise reduction (MsMLNR) circuit 504 for performing MsMLNR on the at least one pixel or the group of pixels (e.g., each pixel) of downscaled versions 456. Details about structures and operations of MLNR circuit 502 and MsMLNR circuit 504 are provided in relation to FIG. 5, FIG. 6, FIG. 7, and FIG. 12.

Example Architecture of De-Noising Circuit

Figure 5:
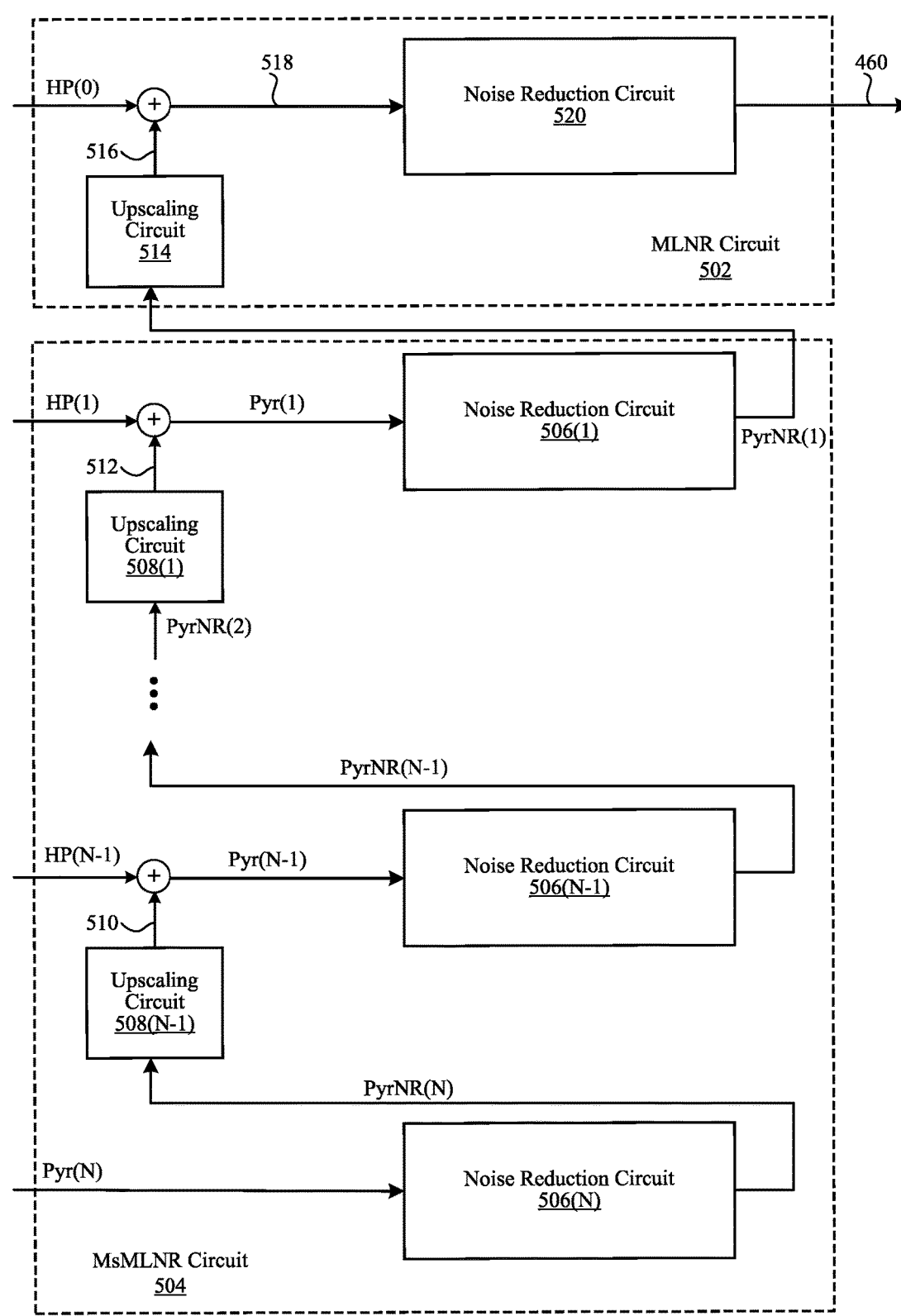
FIG. 5 is a block diagram of a de-noising circuit, according to one embodiment.

FIG. 5 is a block diagram of de-noising circuit 458, according to one embodiment. De-noising circuit 458 may generate denoised image 460 by performing noise reduction on at least one pixel (e.g., each pixel) of unscaled version 454 and on at least one pixel (e.g., each pixel) of downscaled multi-color versions 456. As discussed above with reference to FIG. 4, de-noising circuit 458 may include MLNR circuit 502 and MsMLNR circuit 504 coupled to MLNR circuit 502.

MsMLNR circuit 504 may generate a first noise-reduced downscaled version of image pyramid 452, PyrNR(1) using the Nth scale (e.g., pyramid level) of downscaled versions 456, Pyr(N), and high frequency components of scales N−1, N−2, . . . , 2, 1 of downscaled versions 456 (e.g., HP(N−1), HP(N−2), . . . , HP(2), HP(1)). The first noise-reduced downscaled version of image pyramid, PyrNR(1), generated by MsMLNR circuit 504 corresponds to a first downscaled level of image pyramid 452, and has a pixel resolution equal to a quarter of a pixel resolution of unscaled version 454.

A noise reduction circuit 506(N) of MsMLNR circuit 504 associated with the Nth scale may first perform noise reduction on at least one pixel (e.g., each pixel) of Pyr(N) to generate a noise-reduced version of the Nth scale, PyrNR(N), which is passed onto an upscaling circuit 508(N−1) associated with the (N−1)th scale. Upscaling circuit 508(N−1) may perform upscaling (e.g., by a factor of two in both horizontal and vertical dimensions) of PyrNR(N) to generate an upscaled version 510 which is an upscaled version of PyrNR(N). Upscaled version 510 may be added to a high frequency component of the (N−1)th scale of downscaled versions 456, HP(N−1), to reconstruct the (N−1)th scale (e.g., pyramid level) Pyr(N−1) provided onto a noise reduction circuit 506(N−1) associated with the (N−1)th scale. Noise reduction circuit 506(N−1) may perform noise reduction on at least one pixel (e.g., each pixel) of Pyr(N−1) to generate a noise-reduced version of the (N−1)th scale, PyrNR(N−1), which is passed onto a corresponding upscaling circuit for the (N−2)th scale (not shown). The noise reduction and upscaling process may continue in the same manner for remaining scales of image pyramid 452 (e.g., scales N−2, N−3, etc.) so that a noise-reduced version of scale 2, PyrNR(2), may be generated and passed onto an upscaling circuit 508(1) associated with scale 1. Upscaling circuit 508(1) may perform upscaling (e.g., by a factor of two in both horizontal and vertical dimensions) of PyrNR(2) to generate an upscaled version 512 which is an upscaled version of PyrNR(2). Upscaled version 512 may be added to a high frequency component of scale 1 of downscaled versions 456, HP(1), to reconstruct scale 1 (e.g., pyramid level) Pyr(1) provided onto a noise-reduction circuit 506(1) associated with scale 1. Noise-reduction circuit 506(1) may perform noise reduction on at least one pixel (e.g., each pixel) of Pyr(1) to generate a noise-reduced version of scale 1, PyrNR(1). PyrNR(1) represents the first noise-reduced downscaled version of image pyramid 452, which is output from MsMLNR circuit 504 and provided to MLNR circuit 502. In one or more embodiments, MsMLNR circuit 504 operates in a bypass mode. When in the bypass mode, MsMLNR circuit 504 may rebuild the image pyramid (e.g., reconstruct Pyr(1)) from Pyr(N), HP(N−1), HP(N−2), . . . , HP(1) without applying any noise filtering, e.g., noise-reduction circuits 506(N), 506(N−1), . . . , 506(1) may be bypassed in such case.

MLNR circuit 502 may generate denoised image 460 using the first noise-reduced downscaled version, PyrNR(1), and a high frequency component of unscaled version 454, HP(0). The first noise-reduced downscaled version, PyrNR(1), may be provided onto an upscaling circuit 514 that may perform upscaling (e.g., by a factor of two in both horizontal and vertical dimensions) of PyrNR(1) to generate an upscaled version 516 which is an upscaled version of PyrNR(1). Upscaled version 516 may be added to the high frequency component of unscaled version 454, HP(0), to reconstruct an unscaled multi-color version 518 provided onto a noise-reduction circuit 520. Noise-reduction circuit 520 may perform noise reduction on at least one pixel (e.g., each pixel) of unscaled multi-color version 518 to generate denoised image 460.

Example Architecture of Noise Reduction Circuit

Figure 6:
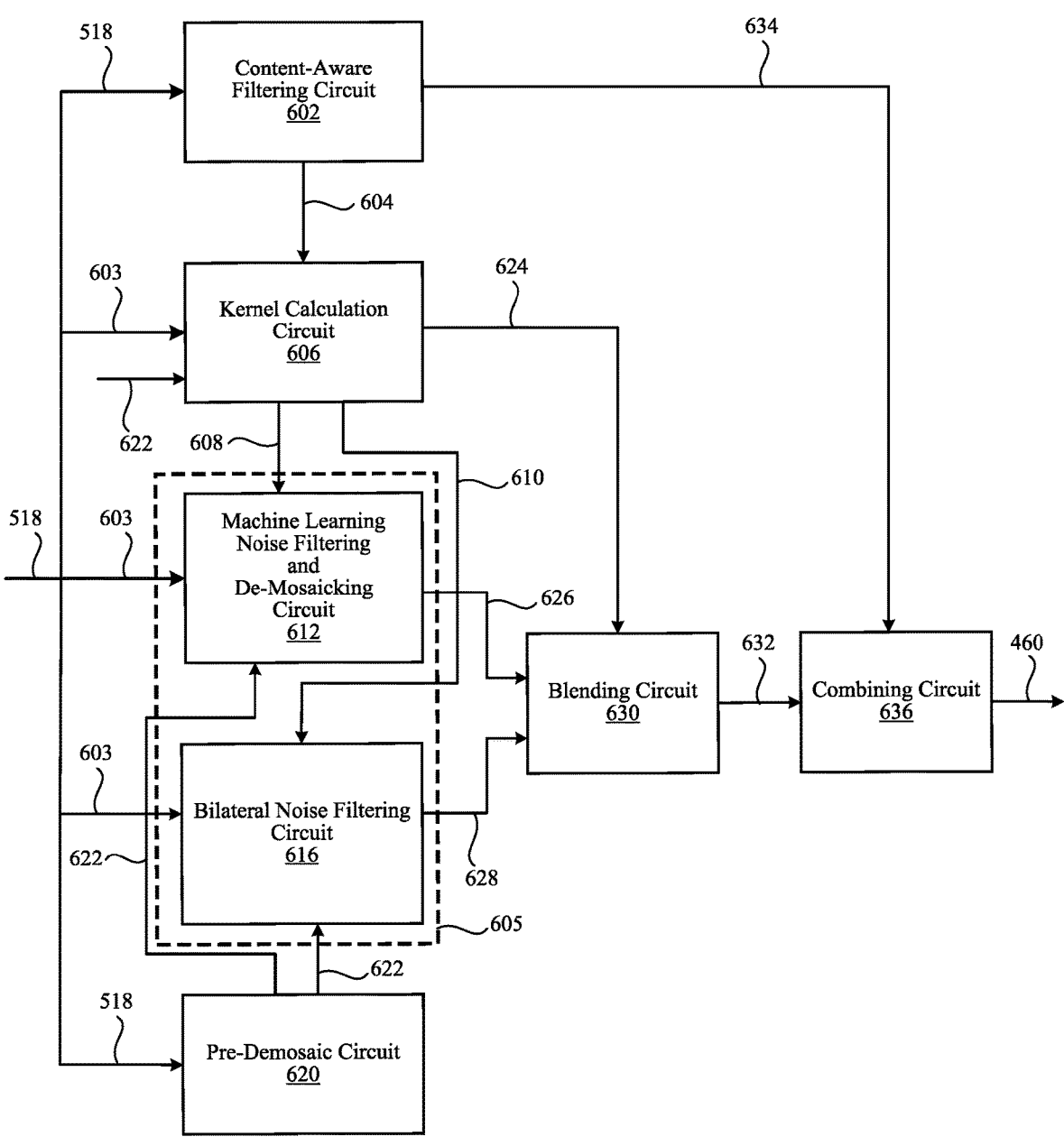
FIG. 6 is a block diagram of a noise reduction circuit of a machine learning-based noise reduction (MLNR) part of the de-noising circuit of FIG. 5, according to one embodiment.

FIG. 6 is a block diagram of noise reduction circuit 520 of MLNR circuit 502, according to one embodiment. Noise reduction circuit 520 may perform noise reduction (e.g., de-noising) on at least one pixel or a group of pixels (e.g., each pixel) of unscaled version 518 to generate denoised image 460. Noise reduction circuit 520 may include a content-aware filtering circuit 602, a kernel calculation circuit 606 coupled to content-aware filtering circuit 602, a noise filtering circuit 605 coupled to kernel calculation circuit 606, a pre-demosaic circuit 620 coupled to noise filtering circuit 605, a blending circuit 630 coupled to kernel calculation circuit 606 and noise filtering circuit 605, and a combining circuit 636 coupled to content-aware filtering circuit 602 and blending circuit 630. Noise reduction circuit 520 may include more or fewer components than what is shown in FIG. 6. Moreover, the various components of noise reduction circuit 520 described in relation to FIG. 6 may be embodied in various combinations of hardware, firmware, or software.

Content-aware filtering circuit 602 may adjust noise filtering strength based on content of unscaled version 518. Content-aware filtering circuit 602 may generate at least one content-awareness parameter 604 for at least one pixel (e.g., each pixel) of unscaled version 518. At least one content-awareness parameter 604 may be passed onto kernel calculation circuit 606 to control noise filtering strength and noise standard deviation estimation in kernel calculation circuit 606 (e.g., noise model pessimism/optimism control). Content-aware filtering circuit 602 may also filter unscaled version 518 to generate a filtered unscaled version 634 that includes a residual (e.g., a defined percentage) of original unscaled version 518.

Pre-demosaic circuit 620 may generate a de-mosaiced version of unscaled version 518. Pre-demosaic circuit 620 may estimate each color component for each pixel (e.g., at least one pixel) of unscaled version 518 to generate the de-mosaiced version of unscaled version 518. Pre-demosaic circuit 620 may estimate each color component by preforming, e.g., RGB colors interpolation based on estimated cross color energy and diagonal direction (green) interpolation. The de-mosaiced version of unscaled version 518 may include pixel values that represent initial estimates of all color components for each pixel of unscaled version 518. Pre-demosaic circuit 620 may pass at least one color component value 622 of the de-mosaiced version of unscaled version 518 for a currently processed pixel onto kernel calculation circuit 606 and noise filtering circuit 605. Pre-demosaic circuit 620 may be active when unscaled version 518 is in Bayer raw format, and pre-demosaic circuit 620 may be bypassed (e.g., turned off) when unscaled version 518 is in YCrCb format.

Kernel calculation circuit 606 may generate an adaptive denoising/de-mosaicking kernel 608 for at least one pixel (e.g., each pixel) of unscaled version 518. Kernel calculation circuit 606 may further generate a bilateral kernel 610 for the at least one pixel (e.g., each pixel) of unscaled version 518. Kernel calculation circuit 606 may receive, for the at least one pixel (e.g., each pixel) of unscaled version 518, a corresponding patch 603 (e.g., of size 5×5 or 7×7) including the at least one pixel (e.g., each pixel) as a central pixel in the patch and other pixels within a defined vicinity surrounding the central pixel. Kernel calculation circuit 606 may further receive at least one color component value 622 of a currently processed pixel (e.g., central pixel in patch 603) generated by pre-demosaic circuit 620. Kernel calculation circuit 606 may generate denoising/de-mosaicking kernel 608 by processing corresponding patch 603 using at least one ML filter bank associated with unscaled version 518 and optionally by utilizing at least one content-awareness parameter 604.

Kernel calculation circuit 606 may adjust coefficients of denoising/de-mosaicking kernel 608 using photometric distances (e.g., Mahalanobis distances) between at least one color component value 622 of the currently processed pixel from pre-demosaic circuit 620 and pixel values of non-central pixels in corresponding patch 603 of unscaled version 518. Kernel calculation circuit 606 may further generate bilateral kernel 610 by determining a level of photometric similarity between at least one color component value 622 of the currently processed pixel from pre-demosaic circuit 620 and pixel values of non-central pixels in corresponding patch 603 of unscaled version 518. The level of photometric similarity may be determined by computing, e.g., Mahalanobis distances between at least one color component value 622 of the currently processed pixel from pre-demosaic circuit 620 and pixel values of other pixels in corresponding patch 603 of unscaled version 518. Kernel calculation circuit 606 may pass computed denoising/de-mosaicking kernel 608 and bilateral kernel 610 to noise filtering circuit 605.

Kernel calculation circuit 606 may further calculate alpha parameter 624 (e.g., blending weight) for the at least one pixel (e.g., each pixel) of unscaled version 518. Alpha parameter 624 may represent a soft quality measure for denoising/de-mosaicking kernel 608 for the at least one pixel (e.g., each pixel) of unscaled version 518. Kernel calculation circuit 606 may pass alpha parameter 624 onto blending circuit 630. More details about a structure and operation of kernel calculation circuit 606 are provided in relation to FIG. 7.

Noise filtering circuit 605 may perform noise reduction for at least one pixel (e.g., each pixel) of unscaled version 518 by de-mosaicking and noise filtering corresponding patch 603 using denoising/de-mosaicking kernel 608 and bilateral kernel 610. Noise filtering circuit 605 may include a ML noise filtering and de-mosaicking circuit 612 coupled to kernel calculation circuit 606, and a bilateral noise filtering circuit 616 coupled to kernel calculation circuit 606.

ML noise filtering and de-mosaicking circuit 612 may perform simultaneous noise filtering (e.g., bilateral filtering) and de-mosaicking of the at least one pixel (e.g., each pixel) of unscaled version 518 using denoising/de-mosaicking kernel 608 to generate a de-noised and de-mosaicked version 626 of unscaled version 518 that is passed onto blending circuit 630. Denoising/de-mosaicking kernel 608 may include weights for each color component of the currently processed pixel in patch 603 (e.g., 7×7 neighborhood) that represent initial guidance for that color component of the currently processed pixel. ML noise filtering and de-mosaicking circuit 612 may generate de-noised and de-mosaicked version 626 in, e.g., 4:4:4 Bayer raw format. Each color component (e.g., R, G and B color components) in de-noised and de-mosaicked version 626 may be generated at ML noise filtering and de-mosaicking circuit 612 by convolving each color component value 622 of the currently processed pixel from pre-demosaic circuit 620 and corresponding color component values of non-central pixels in patch 603 with kernel coefficients of denoising/de-mosaicking kernel 608 for that color component.

Bilateral noise filtering circuit 616 may perform noise filtering of the at least one pixel (e.g., each pixel) of unscaled version 518 using bilateral kernel 610 to generate a de-noised version 628 of unscaled version 518 that is passed onto blending circuit 630. Bilateral noise filtering circuit 616 may perform the noise filtering by convolving at least one color component value 622 of the currently processed pixel from pre-demosaic circuit 620 and pixel values of non-central pixels in patch 603 with kernel coefficients of bilateral kernel 610. Bilateral noise filtering circuit 616 may further perform demosaic processing (e.g., color estimation) for adjusting the pixel values of the non-central pixels in patch 603 before convolution with the kernel coefficients of bilateral kernel 610.

Blending circuit 630 may blend (e.g., per pixel) de-noised and de-mosaicked version 626 with de-noised version 628 to generate a de-noised version 632 of unscaled version 518. Blending circuit 630 may blend (e.g., per pixel) de-noised and de-mosaicked version 626 with de-noised version 628 using alpha parameter 624. If alpha parameter 624 is higher (e.g., more than 0.5), more weights during the blending process may be given to pixel values of de-noised and de-mosaicked version 626 as denoising/de-mosaicking kernel 608 is considered to be of a higher quality than bilateral kernel 610. Similarly, if alpha parameter 624 is lower (e.g., less than 0.5), more weights during the blending process may be given to pixel values of de-noised version 628 as bilateral kernel 610 is considered to be of a higher quality than denoising/de-mosaicking kernel 608. Blending circuit 630 may pass de-noised version 632 onto combining circuit 636.

Combining circuit 636 may combine filtered unscaled version 634 (e.g., residual of unscaled version 518) with de-noised version 632 to generate denoised image 460 (e.g., pyramid level 0). Combining circuit 636 may add a color component value (e.g., luma component or the Bayer sampled component) of each pixel in filtered unscaled version 634 to a color component value (e.g., luma component or the Bayer sampled component) of each pixel in de-noised version 632 to generate denoised image 460.

Figure 7:
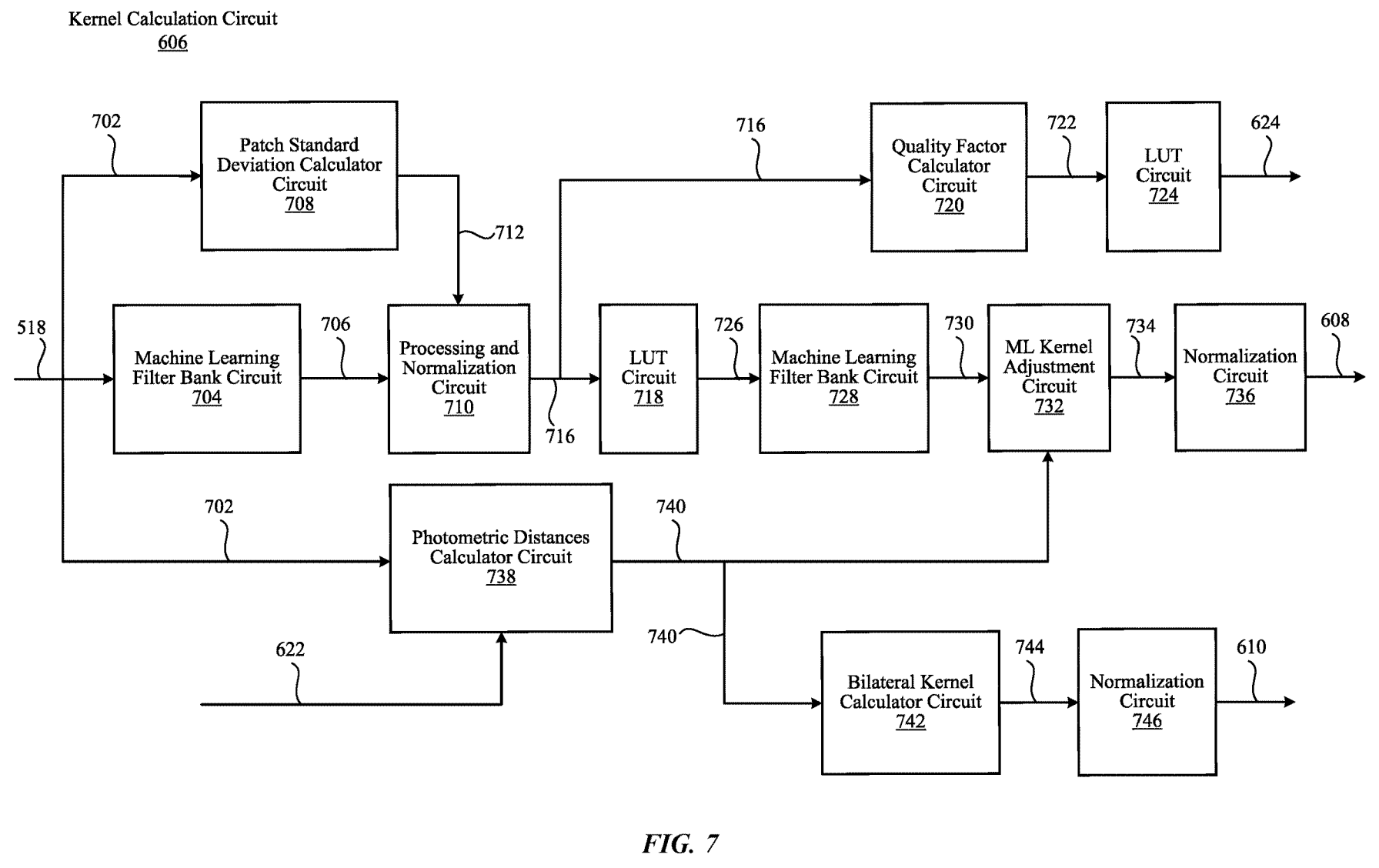

FIG. 7 is a block diagram of kernel calculation circuit 606 of MLNR circuit 502, according to one embodiment. Kernel calculation circuit 606 may generate denoising/de-mosaicking kernel 608 for at least one pixel (e.g., each pixel) of unscaled version 518. Kernel calculation circuit 606 may also generate bilateral kernel 610 for the at least one pixel (e.g., each pixel) of unscaled version 518. Kernel calculation circuit 606 may further generate an alpha parameter 624 (e.g., blending weight) for the at least one pixel (e.g., each pixel) of unscaled version 518.

Kernel calculation circuit 606 may include a ML filter bank circuit 704, a patch standard deviation calculator circuit 708, a processing and normalization circuit 710 coupled to ML filter bank circuit 704 and standard deviation calculator circuit 708, a look-up table (LUT) circuit 718 coupled to processing and normalization circuit 710, a ML filter bank circuit 728 coupled to LUT circuit 718, a photometric distances calculator circuit 738, a ML kernel adjustment circuit 732 coupled to photometric distances calculator circuit 738 and ML filter bank circuit 728, a normalization circuit 736 coupled to ML kernel adjustment circuit 732, a bilateral kernel calculator circuit 742 coupled to photometric distances calculator circuit 738, a normalization circuit 746 coupled to bilateral kernel calculator circuit 742, a quality factor calculator circuit 720 coupled to an output of processing and normalization circuit 710, and a LUT circuit 724 coupled to an output of quality factor calculator circuit 720. Kernel calculation circuit 606 may include more or fewer components than what is shown in FIG. 7. Moreover, the various components of kernel calculation circuit 606 described in relation to FIG. 7 may be embodied in various combinations of hardware, firmware, or software.

ML filter bank circuit 704 may generate classification weights 706 for at least one pixel (e.g., each pixel) of unscaled version 518. ML filter bank circuit 706 may perform, for at least one pixel (e.g., each pixel) of unscaled version 518, classification of pixel values for a single color component (e.g., luma component) or a Bayer sampled component of a corresponding patch 702 (e.g., 7×7 patch of pixels) of unscaled version 518 using a first set of ML kernels associated with unscaled version 518 to obtain classification weights 706 for the single color component (or the Bayer sampled component) of the at least one pixel (e.g., each pixel) of unscaled version 518. The first set of ML kernels may be stored as part of ML filter bank circuit 704 and include multiple sets (e.g., two sets) of analysis kernels. The first set of analysis kernels stored in ML filter bank circuit 704 may include real parts of analysis kernels (e.g., a bank of cosine kernels). The second set of analysis kernels stored in ML filter bank circuit 704 may include imaginary parts of analysis kernels (e.g., a bank of sine kernels). Thus, the first set of ML kernels stored in ML filter bank circuit 704 may include a set of complex analysis kernels (e.g., 16 analysis kernels with real and imaginary parts). The first set of ML kernels (e.g., the set of complex analysis kernels) may be obtained by performing machine learning on training image data provided to ML filter bank circuit 704. Classification weights 706 generated by ML filter bank circuit 704 using the first set of ML kernels may include real and imaginary parts of weights (e.g., 16 classification weights with real and imaginary parts). Classification weights 706 generated for the at least one pixel (e.g., each pixel) of unscaled version 518 may be passed onto processing and normalization circuit 710.

Patch standard deviation calculator circuit 708 may determine a patch standard deviation 712 for the at least one pixel (e.g., each pixel) in patch 702 of unscaled version 518. Patch standard deviation calculator circuit 708 may determine patch standard deviation 712 by calculating a standard deviation of pixel values in patch 702. Patch standard deviation calculator circuit 708 may calculate the standard deviation by calculating a mean and variance of pixel values of the other pixels in patch 702 and a pixel value of the central pixel in patch 702. For implementation convenience, patch standard deviation calculator circuit 708 may compute and output patch standard deviation 712 as an inverse value of the standard deviation. Patch standard deviation calculator circuit 708 may pass patch standard deviation 712 to processing and normalization circuit 710.

Processing and normalization circuit 710 may process classification weights 706 for the at least one pixel (e.g., each pixel) of unscaled version 518 to generate normalized weights 716 for the at least one pixel (e.g., each pixel) of unscaled version 518. Processing and normalization circuit 710 may first compute absolute values (e.g., norms) of complex classification weights 706 (e.g., absolute value of each real-imaginary pair of classification weights 706) to generate absolute weights (e.g., a vector of 16 absolute weights). Processing and normalization circuit 710 may then normalize the absolute weights by patch standard deviation 712 (e.g., by multiplying with the inverse value of the standard deviation) to obtain normalized weights 716 (e.g., a vector of 16 normalized weights) for the at least one pixel (e.g., each pixel) of unscaled version 518.

Normalized weights 716 may be passed onto quality factor calculator circuit 720. Normalized weights 716 may be also processed by LUT circuit 718 to generate processed weights 726 (e.g., a vector of 16 processed weights) for the at least one pixel (e.g., each pixel) of unscaled version 518. LUT circuit 718 may be implemented as a general purpose LUT storing a list of values of a specific function (e.g., Sigmoid function or S-curve). LUT circuit 718 may output each processed weight 726 based on a respective normalized weight 716 that is provided as an entry of LUT circuit 718 and of the specific function stored in LUT circuit 718. Alternatively, instead of LUT circuit 718, a ReLU circuit (not shown in FIG. 7) may be employed to process normalized weights 716 and generate processed weights 726. The ReLU circuit may be implemented as, e.g., a rectified linear unit function element (or some other non-linear function element) that applies a corresponding function onto normalized weights 716 input into the ReLU circuit. Processed weights 726 generated for the at least one pixel (e.g., each pixel) of unscaled version 518 may be passed onto ML filter bank circuit 728.

ML filter bank circuit 728 may generate an initial ML kernel 730 of the single color component (e.g., luma component) or the Bayer sampled component for the at least one pixel (e.g., each pixel) of unscaled version 518 using processed weights 726 and a second set of ML kernels stored as part of ML filter bank circuit 728. The second set of ML kernels stored in ML filter bank circuit 728 may include a set of synthesis kernels, e.g., 16 synthesis kernels. The second set of ML kernels (e.g., set of synthesis kernels) may be obtained by performing machine learning on training image data provided to ML filter bank circuit 728. ML filter bank circuit 728 may perform, for the at least one pixel (e.g., each pixel) of unscaled version 518, weighted average of the second set of ML kernels (e.g., weighted average of the synthesis kernels) using processed weights 726 to generate initial ML kernel 730 for the single color component or the Bayer sampled component of the at least one pixel (e.g., each pixel) of unscaled version 518. Initial ML kernel 730 may be passed onto ML kernel adjustment circuit 732 for further adjustment.

Photometric distances calculator circuit 738 may compute a set of photometric distances 740 (e.g., Mahalanobis distances) between at least one color component value 622 of the currently processed pixel from pre-demosaic circuit 620 and pixel values of other pixels (e.g., non-central pixels) in patch 702 (e.g., patch of size 7×7 pixels). Each photometric distance 740 represents a measure of photometric similarity between at least one color component value 622 of the currently processed pixel from pre-demosaic circuit 620 and a pixel value of a respective non-central pixel in patch 702. Set of photometric distances 740 may be passed onto ML kernel adjustment circuit 732 and bilateral kernel calculator circuit 742.

ML kernel adjustment circuit 732 may adjust initial ML kernel 730 for the single color component (or the Bayer sampled component) of the at least one pixel (e.g., each pixel) of unscaled version 518 using photometric distances 740 to generate an adjusted ML kernel 734 for the single color component (or the Bayer sampled component) of the at least one pixel (e.g., each pixel) of unscaled version 518. To avoid amplification or attenuation of a denoised image, normalization circuit 736 may perform normalization of coefficients of adjusted ML kernel 734 to generate denoising/de-mosaicking kernel 608 (e.g., final ML kernel) for the at least one pixel (e.g., each pixel) of unscaled version 518.

Bilateral kernel calculator circuit 742 may compute an initial bilateral kernel 744 for the single color component (or the Bayer sampled component) of the at least one pixel (e.g., each pixel) of unscaled version 518 using photometric distances 740. To avoid amplification or attenuation of a denoised image, normalization circuit 746 may perform normalization of coefficients of initial bilateral kernel 744 to generate final bilateral kernel 610 for the at least one pixel (e.g., each pixel) of unscaled version 518.

Quality factor calculator circuit 720 may calculate a quality factor 722 for the at least one pixel (e.g., each pixel) of unscaled version 518 using normalized weights 716 for the at least one pixel (e.g., each pixel) of unscaled version 518. Quality factor 722 may represent a soft quality measure for denoising/de-mosaicking kernel 608 for the at least one pixel (e.g., each pixel) of unscaled version 518. Quality factor 722 may be passed onto LUT circuit 724. The LUT circuit 724 may be implemented as a general purpose LUT storing a list of values of a specific function (e.g., Sigmoid function or S-curve). The LUT circuit 724 may output, for the at least one pixel (e.g., each pixel) of unscaled version 518, alpha parameter 624 based on quality factor 722 that is provided as an entry of LUT circuit 724 and of the specific function stored in LUT circuit 724. Alternatively, instead of LUT circuit 724, a ReLU circuit (not shown in FIG. 7) may be employed to generate alpha parameter 624 for the at least one pixel (e.g., each pixel) of unscaled version 518. The ReLU circuit may compute alpha parameter 624 for the at least one pixel (e.g., each pixel) of unscaled version 518 by applying a rectified linear unit function element of the ReLU circuit to quality factor 722.

Figure 8:
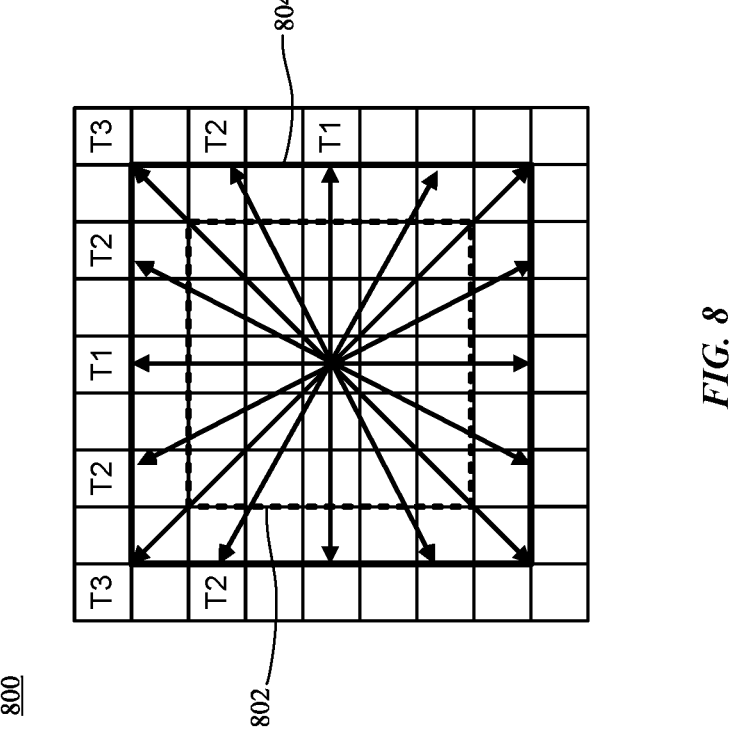
FIG. 8 illustrates directions of different types of base kernels used for derivation of kernels for filter bank circuits of the kernel calculation circuit of FIG. 7, according to one embodiment.
Figure 8:
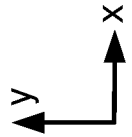

The two sets of analysis kernels used in ML filter bank circuit 704 and the set of synthesis kernels used in ML filter bank circuit 728 may be derived from a set of base kernel types (e.g., three different types of base kernels). FIG. 8 illustrates directions of three different types of base kernels used for deriving kernels of ML filter bank circuits 704 and 728, according to one embodiment. Type 1 (T1) base kernel may be utilized to derive (e.g., via rotation and/or reflection)

a first portion of kernels in ML filter bank circuits 704 and 728 that are directional along X and Y axes (e.g., horizontal and vertical directions in FIG. 8). Type 2 (T2) base kernel may be used to derive (e.g., via rotation and/or reflection) a second portion of kernels in ML filter bank circuits 704 and 728 that are directional along 22.5*(2M−1) degree axes, where M=1, 2, 3, 4, as shown in FIG. 8. Type 3 (T3) base kernel may be used to derive (e.g., via rotation) a third portion of kernels in ML filter bank circuits 704 and 728 that are directional along 45*(2M−1) degree axes, where M=1, 2, as shown in FIG. 8. In an embodiment, T1, T2 and T3 base kernels may be of size 5×5 with each kernel coefficient represented as one square in an area 802. In another embodiment, T1, T2 and T3 base kernels may be of size 7×7 with each kernel coefficient represented as one square in an area 804.

Register files of ML filter bank circuits 704 and 728 may store (or pack) only a portion of kernel coefficients of T1, T2, T3 base kernels. ML filter bank circuits 704 and 728 may recover (or unpack) the remaining kernel coefficients of T1, T2, T3 kernels based on the stored kernel coefficients by using an even symmetry of kernel coefficients to derive, e.g., sine analysis kernels, or by using an odd symmetry of kernel coefficients to derive, e.g., cosine analysis kernels. Even symmetry is a symmetry of kernel coefficients with respect to Y axis, e.g., when F(−X) equals-F(X) that characterizes the sine function. Odd symmetry is a symmetry of kernel coefficients with respect to an origin (intersection of X axis and Y axis), e.g., when F(−X)=F(X) that characterizes the cosine function.

Figures 9A, 9B, 9C:
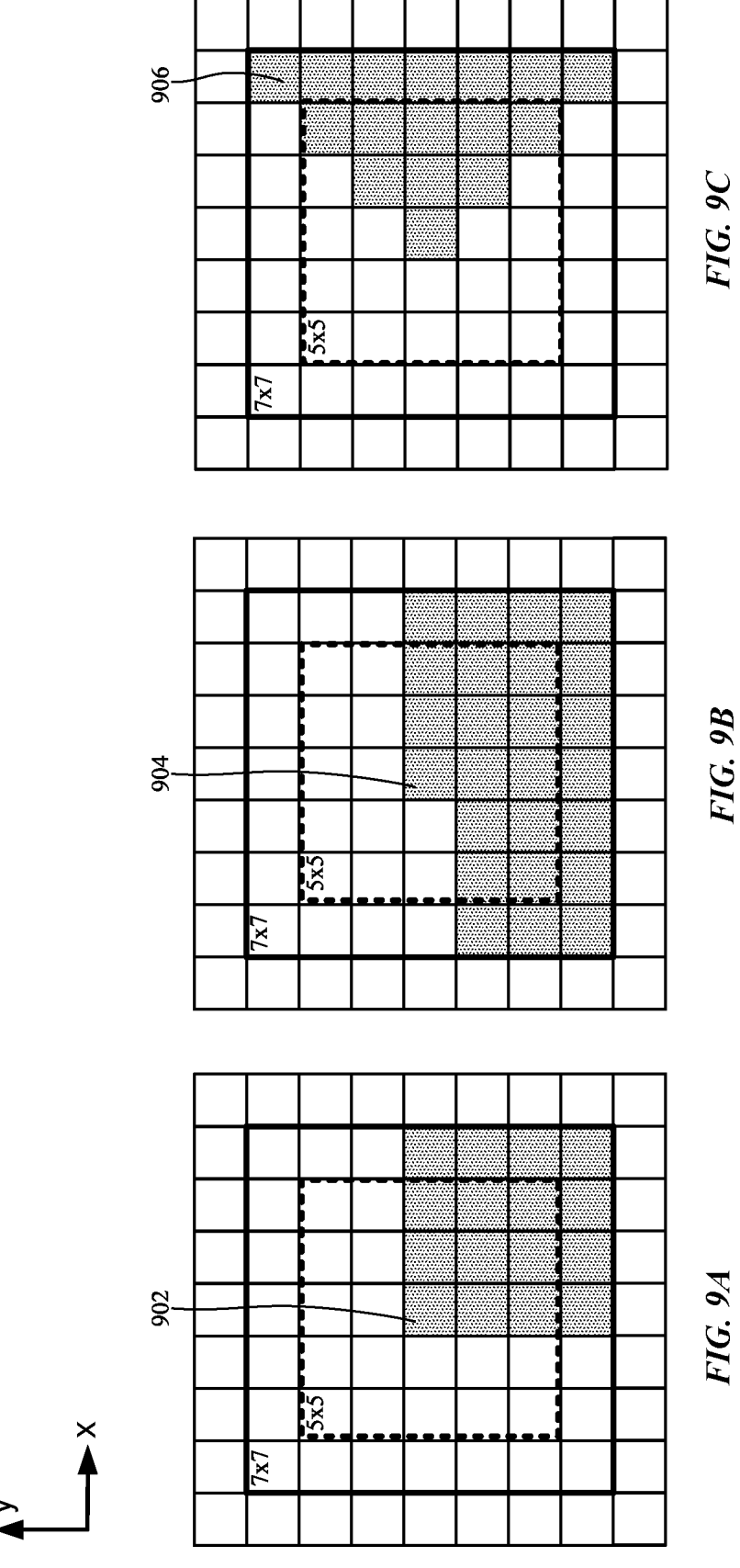
FIGS. 9A-9C illustrate packing of kernel coefficients of different types of base kernels stored in the filter bank circuits of the kernel calculation circuit of FIG. 7 for scale 0 in YCbCr format, according to one embodiment.

In embodiments related to YCrCb mode, the register files of ML filter bank circuits 704 and 728 store (e.g., pack) kernel coefficients 902, 904, 906 of T1, T2, T3 base kernels shown in FIGS. 9A-9C for a single color component (e.g., Y component) of unscaled image data. FIG. 9A illustrates an example packing of kernel coefficients 902 of T1 base kernel in register files of ML filter bank circuits 704 and 728 for unscaled image data, according to one embodiment. FIG. 9B illustrates an example packing of kernel coefficients 904 of T2 base kernel in register files of ML filter bank circuits 704 and 728 for unscaled image data, according to one embodiment. FIG. 9C illustrates an example packing of kernel coefficients 906 of T3 base kernel in register files of ML filter bank circuits 704 and 728 for unscaled image data, according to one embodiment. A size of the T1, T2, T3 base kernels may be configurable, e.g., the size of T1, T2, T3 base kernels may be 5×5 or 7×7.

Figures 10A, 10B, 10C:
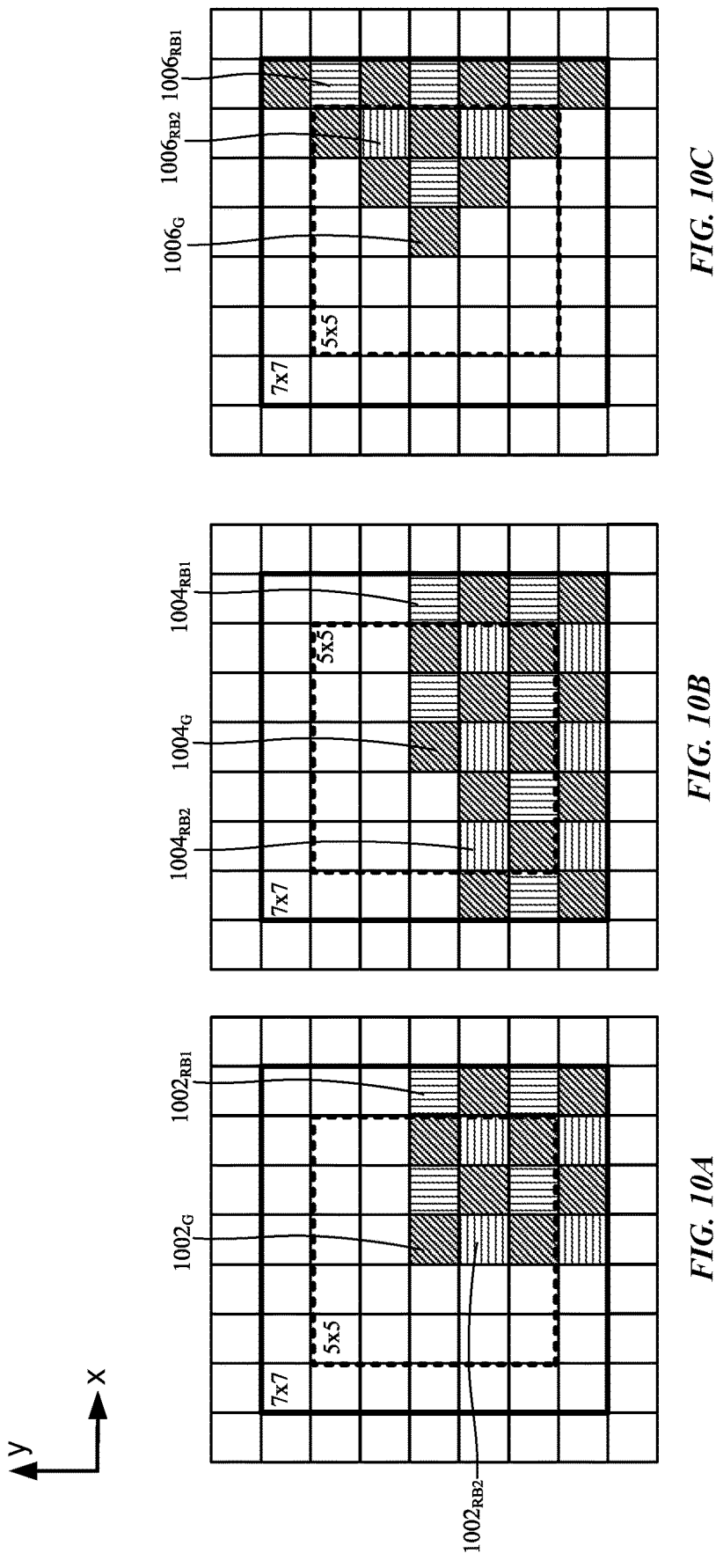
FIGS. 10A-10C illustrate packing of kernel coefficients of different types of base kernels stored in the filter bank circuits of the kernel calculation circuit of FIG. 7 for scale 0 in Bayer raw format and G (green) Bayer grid locations, according to one embodiment.

FIG. 10A illustrates an example packing of kernel coefficients of T1 base kernel stored in register files of ML filter bank circuits 704 and 728 for G Bayer grid locations, according to one embodiment. FIG. 10B illustrates an example packing of kernel coefficients of T2 base kernel in register files of ML filter bank circuits 704 and 728 for G Bayer grid locations, according to one embodiment. FIG. 10C illustrates an example packing of kernel coefficients of T3 base kernel in register files of ML filter bank circuits 704 and 728 for G Bayer grid locations, according to one embodiment. For each G location in the Bayer grid, three sub-kernels may be applied. One sub-kernel with kernel coefficients derived from kernel coefficients $1002_G$, $1004_G$, $1006_G$ may be applied over G components of corresponding pixels of unscaled version 518. Two sub-kernels with kernel coefficients derived from kernel coefficients $1002_{RB1}$, $1004_{RB1}$, $1004_{RB1}$, $1002_{RB2}$, $1004_{RB2}$, $1006_{RB2}$ may be applied over R and B components of the corresponding pixels of unscaled version 518. For G-on-R lines, the sub-kernel with kernel coefficients derived from kernel coefficients $1002_{RB1}$, $1004_{RB1}$, $1006_{RB1}$ may be applied to R components of the corresponding pixels of unscaled version 518, and the sub-kernel with kernel coefficients derived from kernel coefficients $1002_{RB2}$, $1004_{RB2}$, $1006_{RB2}$ may be applied to B components of the corresponding pixels of unscaled version 518. For G-on-B lines, the sub-kernel with kernel coefficients derived from kernel coefficients $1002_{RB1}$, $1004_{RB1}$, $1006_{RB1}$ may be applied to B components of the corresponding pixels of unscaled version 518, and the sub-kernel with kernel coefficients derived from kernel coefficients $1002_{RB2}$, $1004_{RB2}$, $1006_{RB2}$ may be applied to R components of the corresponding pixels of unscaled version 518. A resulting output at each G location may be a sum of absolute values of outputs obtained by applying the three sub-kernels derived from kernel coefficients $1002_G$, $1002_{RB1}$, $1002_{RB2}$, $1004_G$, $1004_{RB1}$, $1004_{RB2}$, $1006_G$, $1006_{RB1}$, $1006_{RB2}$ in FIGS. 10A-10C. Kernel coefficients $1002_G$, $1002_{RB1}$, $1002_{RB2}$, $1004_G$, $1004_{RB1}$, $1004_{RB2}$, $1006_G$, $1006_{RB1}$, $1006_{RB2}$ in FIGS. 10A-10C may be obtained via training using appropriate training image data. A size of the T1, T2, T3 base kernels in FIGS. 10A-10C may be configurable, e.g., the size of T1, T2, T3 base kernels may be 5×5 or 7×7.

Figures 11A, 11B, 11C:
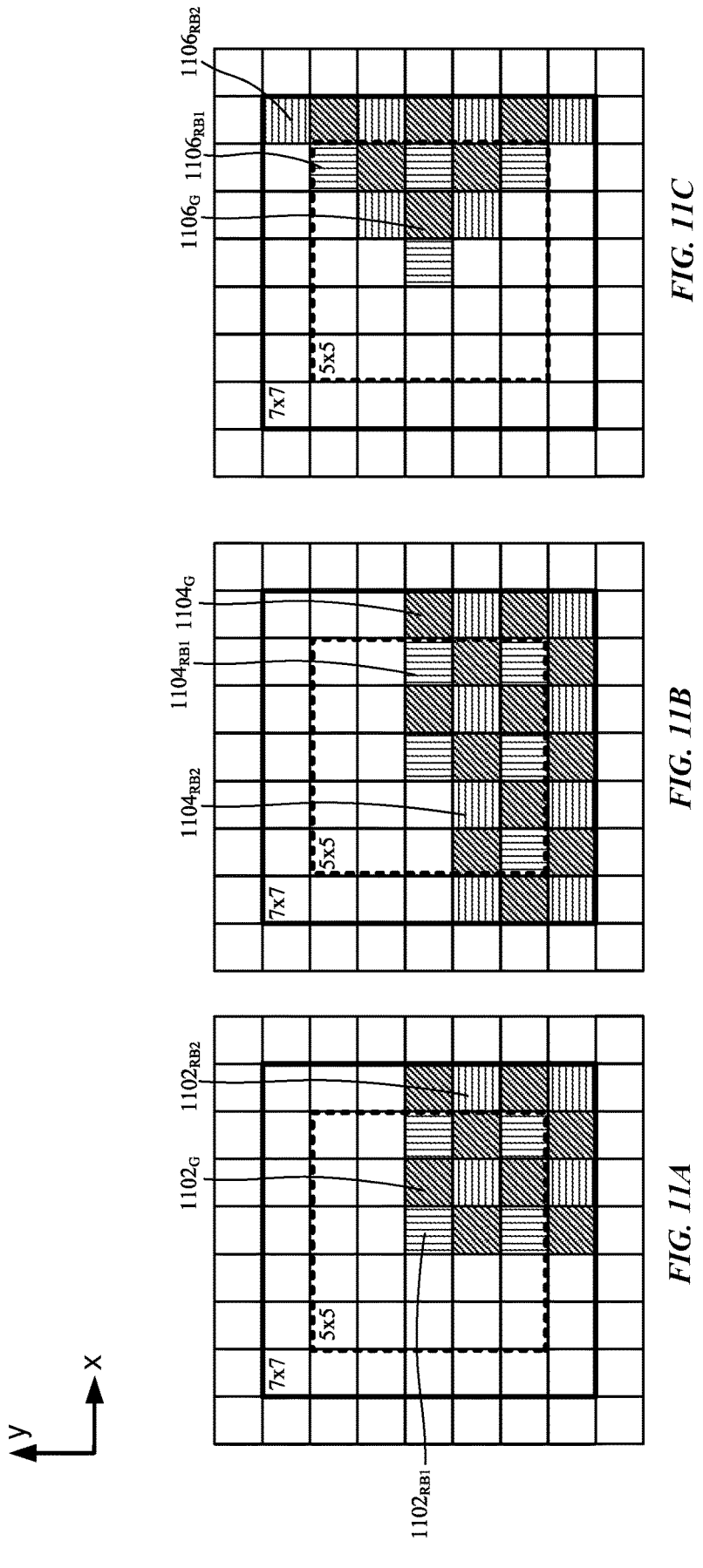
FIGS. 11A-11C illustrate packing of kernel coefficients of different types of base kernels stored in the filter bank circuits of the kernel calculation circuit of FIG. 7 for scale 0 in Bayer raw format and R-B (red-blue) Bayer grid locations, according to one embodiment.

FIG. 11A illustrates an example packing of kernel coefficients of T1 base kernel stored in register files of ML filter bank circuits 704 and 728 for RB Bayer grid locations, according to one embodiment. FIG. 11B illustrates an example packing of kernel coefficients of T2 base kernel in register files of ML filter bank circuits 704 and 728 for RB Bayer grid locations, according to one embodiment. FIG. 11C illustrates an example packing of kernel coefficients of T3 base kernel in register files of ML filter bank circuits 704 and 728 for RB Bayer grid locations, according to one embodiment. For each RB location in the Bayer grid, three sub-kernels may be applied. One sub-kernel with kernel coefficients derived from kernel coefficients $1102_G$, $1104_G$, $1106_G$ may be applied over G components of corresponding pixels of unscaled version 518. Two sub-kernels with kernel coefficients derived from kernel coefficients $1102_{RB1}$, $1104_{RB1}$, $1104_{RB1}$, $1102_{RB2}$, $1104_{RB2}$, $1106_{RB2}$ may be applied over R and B components of the corresponding pixels of unscaled version 518. For G-on-R lines, the sub-kernel with kernel coefficients derived from kernel coefficients $1102_{RB1}$, $1104_{RB1}$, $1106_{RB1}$ may be applied to R components of the corresponding pixels in unscaled version 518, and the sub-kernel with kernel coefficients derived from kernel coefficients $1102_{RB2}$, $1104_{RB2}$, $1106_{RB2}$ may be applied to B components of the corresponding pixels of unscaled version 518. For G-on-B lines, the sub-kernel with kernel coefficients derived from kernel coefficients $1102_{RB1}$, $1104_{RB1}$, $1106_{RB1}$ may be applied to B components of the corresponding pixels of unscaled version 518, and the sub-kernel with kernel coefficients derived from kernel coefficients $1102_{RB2}$, $1104_{RB2}$, $1106_{RB2}$ may be applied to R components of the corresponding pixels of unscaled version 518. A resulting output at each RB location may be a sum of absolute values of outputs obtained by applying the three sub-kernels derived from kernel coefficients $1102_G$, $1102_{RB1}$, $1102_{RB2}$, $1104_G$, $1104_{RB1}$, $1104_{RB2}$, $1106_G$, $1106_{RB1}$, $1106_{RB2}$ in FIGS. 11A-11C. Kernel coefficients $1102_G$, $1102_{RB1}$, $1102_{RB2}$, $1104_G$, $1104_{RB1}$, $1104_{RB2}$, $1106_G$, $1106_{RB1}$, $1106_{RB2}$ in FIGS. 11A-11C may be obtained via training using appropriate training image data. A size of the T1, T2, T3 base kernels in FIGS. 11A-11C may be configurable, e.g., the size of T1, T2, T3 base kernels may be 5×5 or 7×7.

Example Process for Demosaic-Based Noise Reduction

FIG. 12 is a flowchart illustrating a method of demosaic-based noise reduction, according to one embodiment. The method may include additional or fewer steps, and steps may be performed in different orders. The method may be performed by an image processing circuit (e.g., image processor) configured to perform noise reduction on image data, such as by noise reduction circuit 508 of FIG. 6.

The image processing circuit generates 1202 a de-mosaiced version of an image. The image processing circuit may estimate each color component for each pixel of the image to generate the de-mosaiced version of the image. The image being processed may be an unscaled single color version of an input image (e.g., noisy image). The image processing circuit generates 1204 a denoising/de-mosaicking kernel (e.g., denoising kernel) for at least one pixel (e.g., each pixel) of the image and a bilateral kernel for the at least one pixel of the image using the de-mosaiced version of the image.

The image processing circuit performs 1206 noise filtering and de-mosaicking of the image using the denoising/de-mosaicking kernel to generate a first de-noised and de-mosaicked version of the image. The image processing circuit may perform noise filtering and de-mosaicking of the image using the denoising/de-mosaicking kernel (e.g., denoising kernel) and demosaic processing to generate the first de-noised version of the image.

The image processing circuit performs 1208 noise filtering of the image using the bilateral kernel to generate a second de-noised version of the image. The image processing circuit may perform bilateral noise filtering of the image using the bilateral kernel and demosaic processing to generate the second de-noised version of the image.

The image processing circuit blends 1210 the first de-noised and de-mosaicked version with the second de-noised version to generate an output de-noised version of the image. The image processing circuit may blend, per pixel, the first de-noised and de-mosaicked version with the second de-noised version using an alpha parameter for a corresponding pixel to generate the output de-noised version of the image. The output de-noised version of the image may be a de-noised unscaled single color version of the input image.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A circuit, comprising:

a pre-demosaic circuit to generate a de-mosaiced version of an image;

a kernel calculation circuit coupled to the pre-demosaic circuit, the kernel calculation circuit to generate, using the de-mosaiced version of the image, a denoising kernel for at least one pixel of the image and a bilateral kernel for the at least one pixel of the image;

a noise filtering circuit coupled to the kernel calculation circuit and the pre-demosaic circuit, the noise filtering circuit to:

perform noise filtering of the image using the denoising kernel to generate a first de-noised version of the image, and perform noise filtering of the image using the bilateral kernel to generate a second de-noised version of the image; and a blending circuit coupled to the kernel calculation circuit and the noise filtering circuit, the blending circuit to blend the first de-noised version of the image with the second de-noised version of the image to generate an output de-noised version of the image.

2. The circuit of claim 1, wherein the kernel calculation circuit is to:

classify a corresponding patch of the image using a plurality of analysis kernels to obtain a plurality of classification weights for the at least one pixel of the image;

calculate absolute values of the plurality of classification weights to generate a vector of absolute weights for the at least one pixel of the image;

normalize the vector of absolute weights by a patch standard deviation for the at least one pixel of the image to obtain a vector of normalized weights for the at least one pixel of the image;

calculate a quality factor for the at least one pixel of the image using the vector of normalized weights, the quality factor representing a quality measure for the denoising kernel for the at least one pixel of the image; and compute, for the at least one pixel of the image, an alpha parameter by inputting the quality factor into a look-up table (LUT) circuit, and wherein the blending circuit is to blend the first de-noised version of the image with the second de-noised version of the image using the alpha parameter to generate the output de-noised version of the image.

3. The circuit of claim 2, wherein the kernel calculation circuit is to determine the patch standard deviation for the at least one pixel of the image by calculating a standard deviation between the at least one pixel of the image and other pixels in the corresponding patch of the image.

4. The circuit of claim 1, wherein the kernel calculation circuit is further configured to:

classify a corresponding patch of the image using a plurality of analysis kernels to obtain a plurality of classification weights for the at least one pixel of the image;

process the classification weights for the at least one pixel of the image to generate a plurality of normalized weights for the at least one pixel of the image;

calculate a weighted average of a plurality of synthesis kernels using the plurality of normalized weights to generate a version of the denoising kernel for the at least one pixel of the image; and adjust the version of the denoising kernel using Mahalanobis distances between at least one pixel in the de-mosaiced version of the image and other pixels in the corresponding patch of the image to generate the denoising kernel for the at least one pixel of the image.

5. The circuit of claim 4, wherein the kernel calculation circuit is to:

calculate absolute values of the plurality of classification weights to generate a vector of absolute weights for the at least one pixel of the image;

normalize the vector of absolute weights by a patch standard deviation for the at least one pixel of the image to obtain a vector of normalized weights for the at least one pixel of the image; and process the vector of normalized weights by inputting the vector of normalized weights into a look-up table (LUT) circuit to generate the plurality of normalized weights for the at least one pixel of the image.

6. The circuit of claim 1, wherein the kernel calculation circuit is to generate the denoising kernel by processing a corresponding patch of the image using at least one filter bank.

7. The circuit of claim 1, wherein the kernel calculation circuit is to:

generate an initial kernel for the at least one pixel of the image by processing a corresponding patch of the image using at least one filter bank;

generate the denoising kernel by adjusting the initial kernel using photometric distances between at least one pixel in the de-mosaiced version of the image and pixels in the corresponding patch of the image; and generate the bilateral kernel by computing Mahalanobis distances between the at least one pixel in the de-mosaiced version of the image and other pixels in a corresponding patch of the image.

8. The circuit of claim 1, wherein the image comprises an unscaled single color version of an input image, and the output de-noised version of the image comprises a de-noised unscaled single color version of the input image.

9. A method, comprising:

generating a de-mosaiced version of an image;

generating, using the de-mosaiced version of the image, a denoising kernel for at least one pixel of the image and a bilateral kernel for the at least one pixel of the image;

performing noise filtering of the image using the denoising kernel to generate a first de-noised version of the image;

performing noise filtering of the image using the bilateral kernel to generate a second de-noised version of the image; and blending the first de-noised version with the second de-noised version to generate an output de-noised version of the image.

10. The method of claim 9, further comprising:

classifying a corresponding patch of the image using a plurality of analysis kernels to obtain a plurality of classification weights for the at least one pixel of the image;

calculating, absolute values of the plurality of classification weights to generate a vector of absolute weights for the at least one pixel of the image;

determining a patch standard deviation for the at least one pixel of the image by calculating a standard deviation between the at least one pixel of the image and other pixels in the corresponding patch of the image;

normalizing the vector of absolute weights by the patch standard deviation for the at least one pixel of the image to obtain a vector of normalized weights for the at least one pixel of the image;

calculating a quality factor for the at least one pixel of the image using the vector of normalized weights, the quality factor representing a quality measure for the denoising kernel for the at least one pixel of the image;

computing, for the at least one pixel of the image, an alpha parameter by inputting the quality factor into a look-up table (LUT) circuit; and blending the first de-noised version of the image with the second de-noised version of the image using the alpha parameter.

11. The method of claim 9, further comprising:

classifying a corresponding patch of the image using a plurality of analysis kernels to obtain a plurality of classification weights for the at least one pixel of the image;

processing the classification weights for the at least one pixel of the image to generate a plurality of normalized weights for the at least one pixel of the image;

calculating a weighted average of a plurality of synthesis kernels using the plurality of normalized weights to generate a version of the denoising kernel for the at least one pixel of the image; and adjusting the version of the denoising kernel using Mahalanobis distances between at least one pixel in the de-mosaiced version of the image and other pixels in the corresponding patch of the image to generate the denoising kernel for the at least one pixel of the image.

12. The method of claim 11, further comprising:

calculating absolute values of the plurality of classification weights to generate a vector of absolute weights for the at least one pixel of the image;

normalizing the vector of absolute weights for the at least one pixel of the image by a patch standard deviation for the at least one pixel of the image to obtain a vector of normalized weights for each pixel of the image; and processing the vector of normalized weights for the at least one pixel of the image by inputting the vector of normalized weights into a look-up table (LUT) circuit to generate the plurality of normalized weights for the at least one pixel of the image.

13. The method of claim 9, further comprising:

generating an initial kernel for the at least one pixel of the image by processing a corresponding patch of the image using at least one filter bank;

generating the denoising kernel by adjusting the initial kernel using photometric distances between at least one pixel in the de-mosaiced version of the image and pixels in the corresponding patch of the image; and generating the bilateral kernel by computing Mahalanobis distances between the at least one pixel in the de-mosaiced version of the image and other pixels in the corresponding patch of the image.

14. An electronic device, comprising:

an image signal processor to perform noise reduction on an image, the image signal processor including:

a machine learning-based noise reduction (MLNR) circuit, the MLNR circuit comprising:

a pre-demosaic circuit to generate a de-mosaiced version of the image;

a kernel calculation circuit coupled to the pre-demosaic circuit and to generate, using the de-mosaiced version of the image, a denoising kernel for at least one pixel of an image and a bilateral kernel for the at least one pixel of the image, a noise filtering circuit coupled to the kernel calculation circuit, the noise filtering circuit to:

perform noise filtering of the image using the denoising kernel to generate a first de-noised version of the image, and perform noise filtering of the image using the bilateral kernel to generate a second de-noised version of the image, and a blending circuit coupled to the kernel calculation circuit and the noise filtering circuit, the blending circuit to blend the first de-noised version with the second de-noised version to generate an output de-noised version of the image.

15. The circuit of claim 1, wherein the pre-demosaic circuit is to estimate each color component for each pixel of the image to generate the de-mosaiced version of the image.

16. The circuit of claim 1, wherein the noise filtering circuit comprises:

a noise filtering and de-mosaicing circuit to perform noise filtering and de-mosaicing of the image using the denoising kernel and demosaic processing to generate the first de-noised version of the image; and a bilateral noise filtering circuit to perform noise filtering of the image using the bilateral kernel and demosaic processing to generate the second de-noised version of the image.

17. The circuit of claim 1, further comprising a combining circuit coupled to the blending circuit to combine the image with the output de-noised version of the image to generate a final de-noised version of the image.

18. The method of claim 9, further comprising:

estimating each color component for each pixel of the image to generate the de-mosaiced version of the image.

19. The method of claim 9, further comprising:

combining the image with the output de-noised version of the image to generate a final de-noised version of the image.

20. The electronic device of claim 14, wherein the kernel calculation circuit is to:

generate an initial kernel for the at least one pixel of the image by processing a corresponding patch of the image using at least one filter bank;

generate the denoising kernel by adjusting the initial kernel using photometric distances between at least one pixel in the de-mosaiced version of the image and pixels in the corresponding patch of the image; and generate the bilateral kernel for the at least one pixel of the image by computing Mahalanobis distances between the at least one pixel in the de-mosaiced version of the image and other pixels in the corresponding patch of the image.

\* \* \* \* \*